US012197152B2

(12) United States Patent
Katahira et al.

(10) Patent No.: US 12,197,152 B2
(45) Date of Patent: Jan. 14, 2025

(54) IMAGE FORMING APPARATUS

(71) Applicant: CANON KABUSHIKI KAISHA, Tokyo (JP)

(72) Inventors: Ko Katahira, Kanagawa (JP); Motoyasu Muramatsu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/455,523

(22) Filed: Aug. 24, 2023

(65) Prior Publication Data

US 2024/0069471 A1 Feb. 29, 2024

(30) Foreign Application Priority Data

Aug. 26, 2022 (JP) ................................ 2022-134629

(51) Int. Cl.
*G03G 15/20* (2006.01)
*G03G 21/16* (2006.01)

(52) U.S. Cl.
CPC ..... *G03G 15/2035* (2013.01); *G03G 21/1638* (2013.01)

(58) Field of Classification Search
CPC ....................... G03G 15/2035; G03G 21/1638
See application file for complete search history.

(56) References Cited

U.S. PATENT DOCUMENTS 9,709,941 B2 * 7/2017 Kinoshita .......... G03G 15/5016
2010/0028044 A1 * 2/2010 Matsuo .............. G03G 15/2035 399/122
2010/0254728 A1 * 10/2010 Iwase ................. G03G 15/2035 399/122
2012/0082478 A1 * 4/2012 Wang ................. G03G 15/2035 399/110
2014/0293359 A1 * 10/2014 Niikawa ............ G03G 21/1628 358/300

FOREIGN PATENT DOCUMENTS

JP 2010032833 2/2010
JP 2012177743 9/2012
JP 2014048597 3/2014
JP 2021047228 A 3/2021

* cited by examiner

*Primary Examiner* — David H Banh

(74) *Attorney, Agent, or Firm* — Canon U.S.A., Inc. IP Divsion

(57) ABSTRACT

An image forming apparatus includes a fixing unit and an apparatus main body. The fixing unit includes a heating unit, a pressure roller, first and second cam members, and a pressure force release unit. The pressure force release unit switches a position of the heating unit between a first position at which a predetermined pressure force is applied from the pressure roller to a fixing nip portion, and a second position at which the applied predetermined pressure force is reduced or released. The apparatus main body includes first and second doors that are opened and closed and contain the fixing unit. The first cam member rotates with an open and close of the first door, and the second cam member rotates with an open and close of the second door. A rotational center of the second cam member is arranged coaxially with a rotational center of the first cam member.

16 Claims, 22 Drawing Sheets

IMAGE FORMING APPARATUS

BACKGROUND

Field

The present disclosure relates to an image forming apparatus, and in particular, to a configuration of the image forming apparatus in which a pressure force of a fixing device is released in conjunction with an open of a user access door to perform a jam clearance operation in a case where a paper jam occurs in the fixing device.

Description of the Related Art

An image forming apparatus, such as a printer and a facsimile machine, includes a fixing device configured to fix a toner image onto a sheet by applying heat and pressure to the toner image formed on the sheet. The fixing device forms a nip portion with a pressure roller and a heating unit, to apply heat and pressure to the sheet to fix the toner image on the sheet when the sheet passes through the nip portion.

In the above-described image forming apparatus, there is known a technique of releasing a pressure force of the fixing device in conjunction with the open of a door at a time of a jam clearance operation. Japanese Patent Application Laid-open No. 2010-032833 discusses a technique of releasing a pressure force of a fixing device in conjunction with an open of any of a front door and a rear door at a time of a jam clearance operation. In the technique discussed in Japanese Patent Application Laid-open No. 2010-032833, when the front door is opened, the pressure force of the fixing device is released in response to a pressure member being pushed up due to a rotation of a cam member corresponding to the front door. When the rear door is opened, the pressure force of the fixing device is released in response to a pressure member being pushed up due to a rotation of another cam member corresponding to the rear door.

SUMMARY

The disclosed image forming apparatus includes some improvement to reduce space with regard to rotational shafts of cam members for pushing up respective pressure members.

According to an aspect of the present disclosure, an image forming apparatus includes a fixing unit configured to fix a toner image formed on a sheet onto the sheet, and including a heating unit configured to heat the sheet, a pressure roller configured to press the heating unit to form a fixing nip portion to fix the toner image onto the sheet and to apply a predetermined pressure force to the fixing nip portion when the toner image is fixed, a first cam member and a second cam member each having a rotational center, and a pressure force release unit configured to switch a position of the heating unit by a rotation of the first cam member or the second cam member, between a first position at which the predetermined pressure force is applied to the fixing nip portion, and a second position at which the predetermined pressure force applied to the fixing nip portion is reduced or released, and an apparatus main body including first and second doors configured to be opened and closed, and configured to contain the fixing unit, wherein the first cam member rotates in conjunction with an open and close of the first door, and the second cam member rotates in conjunction with an open and close of the second door, and wherein the rotational center of the second cam member is arranged coaxially with the rotational center of the first cam member.

Further features of the present disclosure will become apparent from the following description of exemplary embodiments with reference to the attached drawings.

DESCRIPTION OF THE EMBODIMENTS

As an example configuration of an image forming apparatus according to the present disclosure, an embodiment in which the present disclosure is applied to an electrophotographic laser printer will be specifically described. First, an overall configuration of the image forming apparatus will be described, and next, a configuration of a fixing device of the image forming apparatus will be described.

Figure 1:
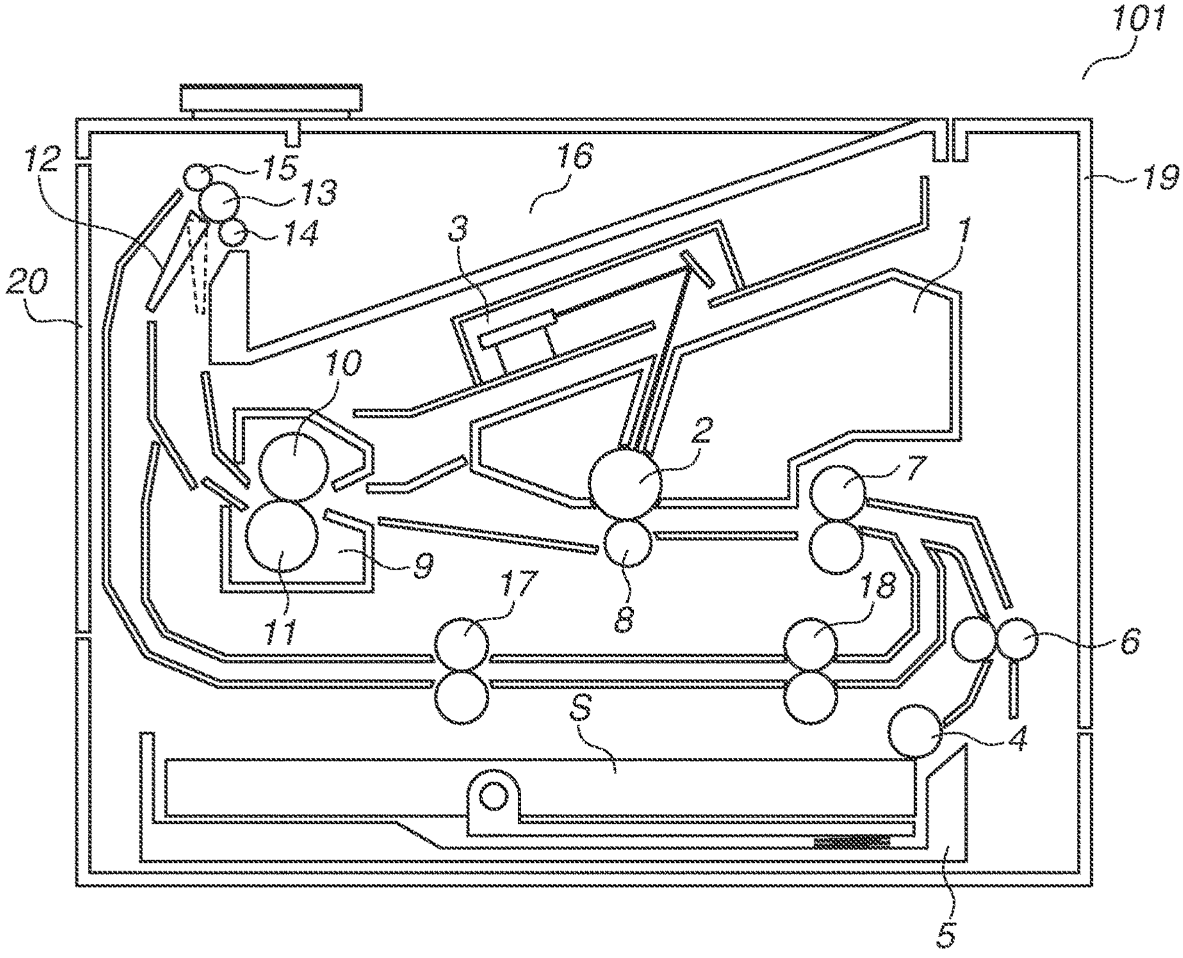
FIG. 1 is a schematic diagram of an image forming apparatus according to a first exemplary embodiment.

FIG. 1 illustrates an example of an image forming apparatus according to a first exemplary embodiment. FIG. 1 is a cross-section diagram illustrating a configuration of an electrophotographic laser printer having a two-sided image forming function. However, dimensions, materials, shapes, and their relative arrangements of components described in the present exemplary embodiment are not intended to limit the range of the present disclosure only to the exemplary embodiments unless otherwise specifically described. The image forming apparatus according to the present disclosure is not limited to the laser printer, and the present disclosure may be applied to other image forming apparatuses such as a copying machine and a facsimile machine.

An image forming apparatus 101 illustrated in FIG. 1 includes a sheet feeding unit, an image forming unit for forming an image on a sheet, a fixing unit, a discharge-sheet reversing unit, and a two-sided conveyance unit, as main components.

The image forming apparatus 101 includes a process cartridge 1 attachable to and detachable from an apparatus main body. The process cartridge 1 is a process unit required for forming a toner image on a sheet using an electrophotographic process, and includes a photosensitive drum 2, and a process unit such as a developing unit and a charging roller (not illustrated). A scanner unit 3 is disposed in a vertically upward direction of the process cartridge 1, to expose the photosensitive drum 2 to light based on an image signal. The photosensitive drum 2 is charged to a predetermined negative potential by a charging roller (not illustrated). Then, the scanner unit 3 scans the photosensitive drum 2 with a laser beam to form an electrostatic latent image on the photosensitive drum 2. The electrostatic latent image is subjected to a reversal development by a developing unit (not illustrated) included in the process cartridge 1, and negatively charged toner is caused to adhere onto a sheet. In this way, a toner image is formed on the sheet.

The sheet feeding unit includes a sheet feeding roller 4 disposed in the image forming apparatus 101, and a sheet cassette 5 for storing sheets, which is attachable to and detachable from the image forming apparatus 101. Sheets S stored in the sheet cassette 5 are separated and fed one by one from the sheet cassette 5 by the sheet feeding roller 4 being rotated due to the power of a sheet feeding drive unit (not illustrated). A fed sheet S is conveyed by a conveyance roller pair 6 to a registration roller pair 7 to be subjected to a skew correction, and conveyed to a transfer unit.

In the transfer unit, a positive polarity bias is applied to a transfer roller 8 by a bias application unit (not illustrated). With this configuration, a toner image is transferred onto the sheet S conveyed to the transfer unit.

The sheet S with the toner image transferred thereon is conveyed to a fixing device 9 disposed downstream of the transfer unit in a conveyance direction. The fixing device 9 is a device to fix the toner image transferred on the sheet S to the sheet S, and includes a heating unit 10 provided with a heater serving as a heating means (not illustrated), and a pressure roller 11 serving as a pressure member rotating in contact with the heating unit 10. The sheet S with the toner image formed thereon is nipped and conveyed by a nip portion formed by the heating unit 10 and the pressure roller 11, and heat and pressure are applied to the toner image so that the toner image is fixed onto the surface of the sheet S.

The sheet S with the toner image fixed thereon is conveyed from the fixing device 9 to the discharge-sheet reversing unit. The discharge-sheet reversing unit includes a two-sided flapper 12 and three rollers including a sheet-discharge roller 13, a sheet discharge roller 14, and a reversing roller 15. In a case where an image is formed on one side of a sheet (one-sided printing), the two-sided flapper 12 is located at a position to guide the sheet S toward a discharge-sheet nip portion formed by the sheet-discharge roller 13 and the sheet discharge roller 14 so that the sheet S is discharged onto a discharge tray 16 by the sheet-discharge roller 13 and the sheet discharge roller 14.

In a case where an image is formed on two sides of a sheet (two-sided printing), the two-sided flapper 12 is located at a position (indicated by a dotted line) to guide the sheet S toward a reversing nip portion formed by the sheet-discharge roller 13 and the reversing roller 15 so that the sheet S is conveyed toward the reversing nip portion by the fixing device 9. The sheet-discharge roller 13 inversely rotates by a rotation direction switching unit (not illustrated) at a timing at which the rear end of the sheet S reaches a predetermined position. In this way, the sheet S with its trailing edge changed to the leading edge passes through a two-sided conveyance roller pair 17 and a sheet-refeeding roller pair 18, to be reconveyed to the registration roller pair 7 with its front-surface and back-surface reversed. Then, in a way similar to a case where the one-sided printing is performed, a second surface (back surface) of the sheet S is subjected to the transfer by the transfer roller 8, and the fixing by the fixing device 9, and the sheet S is discharged to the discharge tray 16 by the sheet-discharge roller 13 and the sheet discharge roller 14. In this way, the two-sided printing is completed.

In a case where a paper jam occurs in the fixing device 9 while the sheet S is being conveyed, a front door 19 or a rear door 20 is opened at a position of the jam occurrence, so that a jam clearance operation is to be performed.

Figure 2:
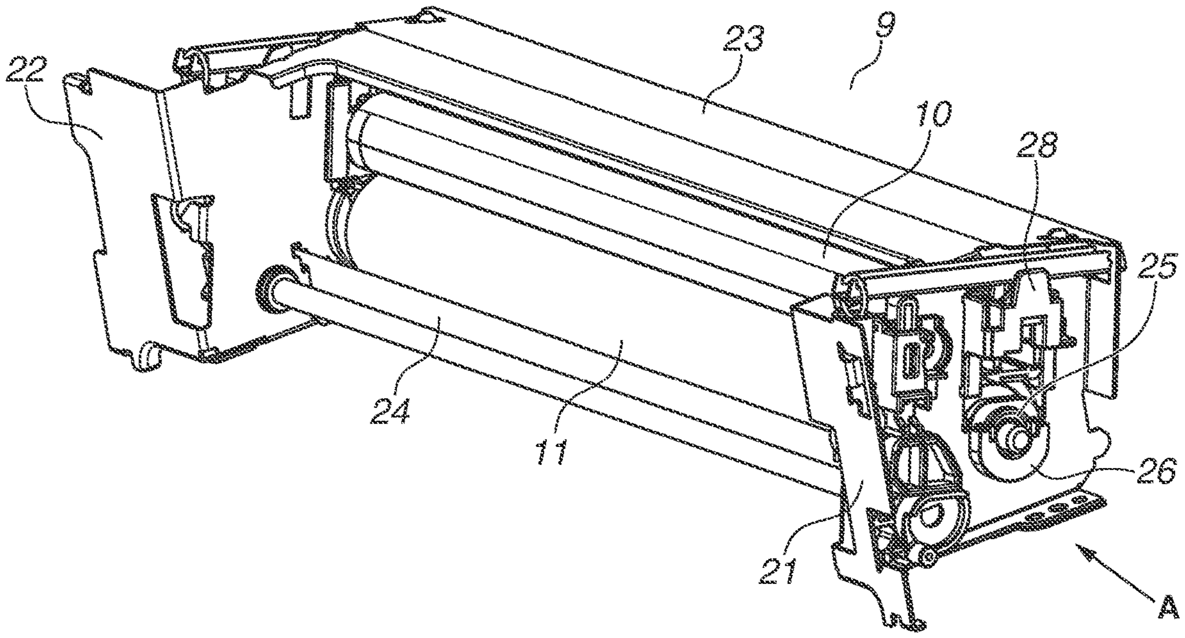
FIG. 2 is a schematic diagram of a fixing device according to the first exemplary embodiment.

The fixing device 9 will be described with reference to FIGS. 2 to 11A and 11B. In the description hereinbelow, fastener members such as screws are not illustrated in the drawings. FIG. 2 is a schematic diagram of the fixing device 9 according to the first exemplary embodiment. The fixing device 9 includes a first side plate 21, a second side plate 22, an upper stay 23, and a lower stay 24. The pressure roller 11 is rotatably supported by the first side plate 21 and the second side plate 22 each via a ball bearing 25 and a bearing 26. The heating unit 10 is attached to the first side plate 21 and the second side plate 22 each via a flange member 28. The pressure roller 11 is disposed on the opposing side of the heating unit 10 to form the nip portion to nip the sheet S.

Figure 3:
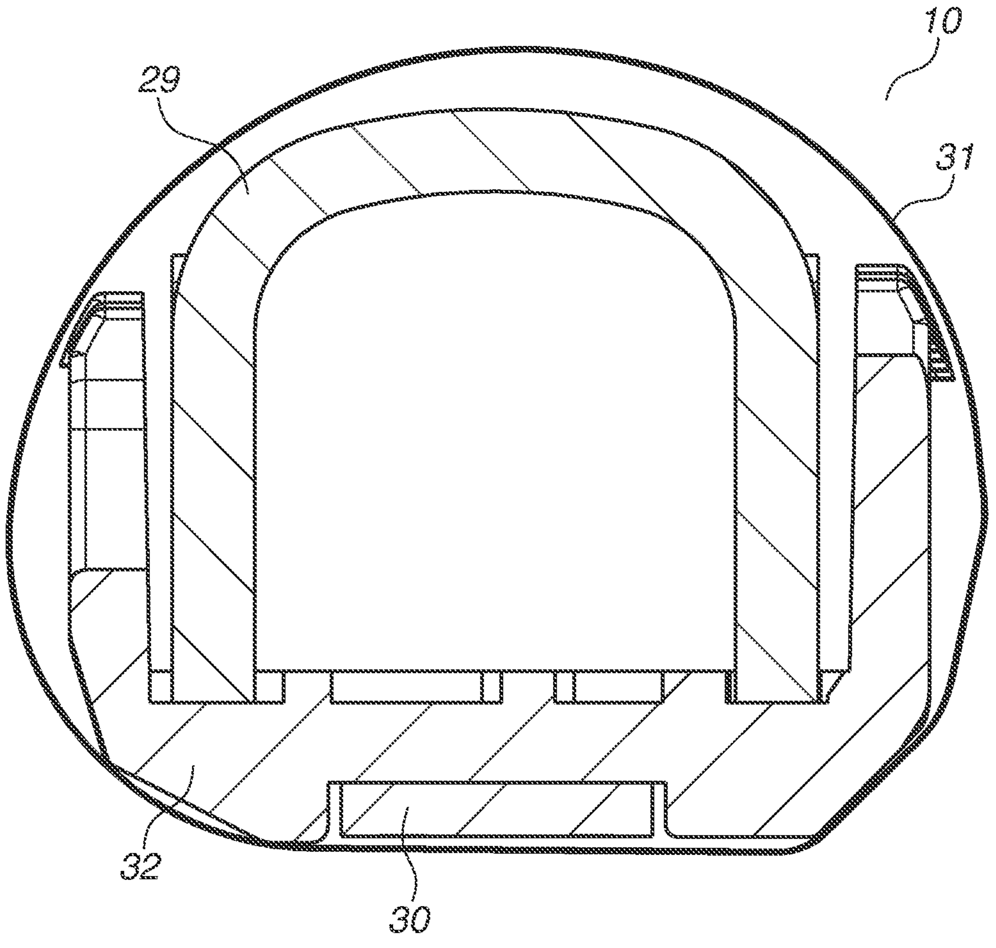
FIG. 3 is a cross-section diagram illustrating a heating unit according to the first exemplary embodiment.

FIG. 3 is a cross-section diagram illustrating a configuration of the heating unit 10. The heating unit 10 mainly includes a heater 30, a pressure stay 29, a fixing film 31, and a film guide 32. The fixing film 31 is a cylindrically formed (endless belt-like shape or sleeve-like shape) flexible film, and is externally fitted loosely to the film guide 32. The heater 30 serving as a heat source is fitted and fixed in a depressed groove portion provided along a lengthwise direction of the film guide 32. The pressure stay 29 has a U-shaped cross-section, is arranged inside the film guide 32, and presses the film guide 32 and the heater 30 toward the pressure roller 11 when receiving a pressing force.

Figure 4A:
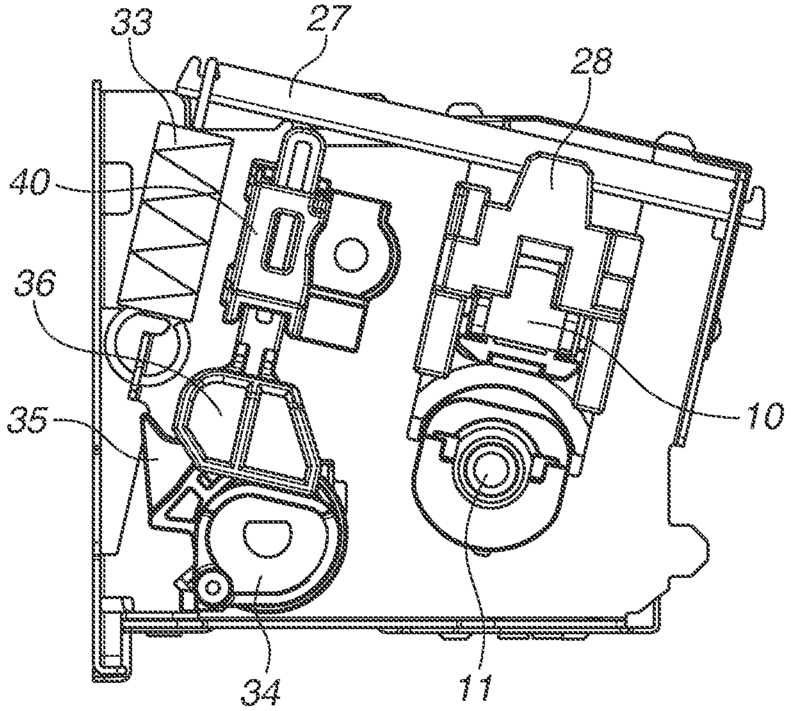
FIGS. 4A and 4B are schematic diagrams illustrating a pressure application mechanism and a pressure release mechanism of the fixing device according to the first exemplary embodiment.
Figure 4B:
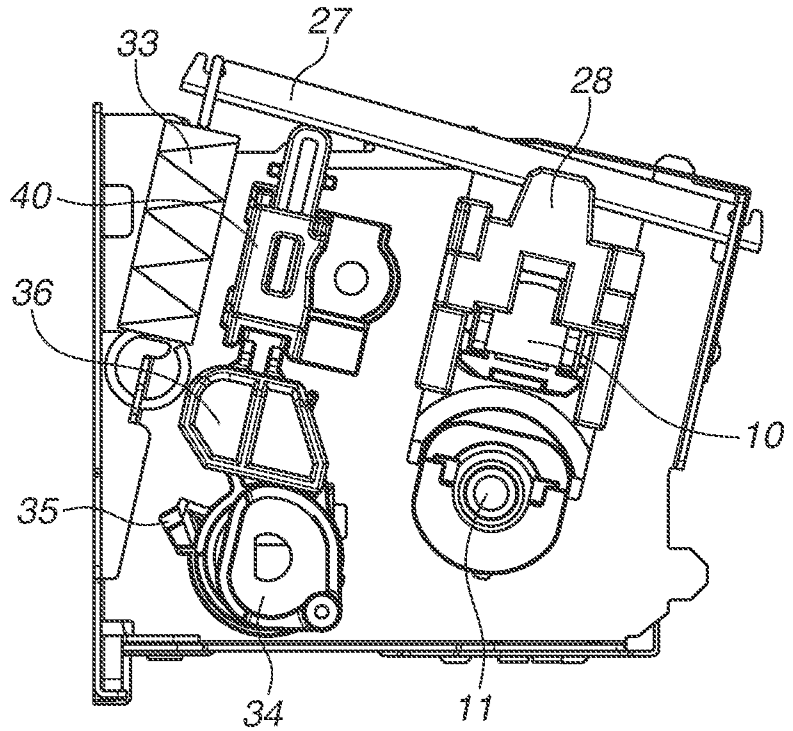

FIGS. 4A and 4B are side views of the fixing device 9 in FIG. 2 seen in an A direction, and schematic diagrams of a pressure application mechanism and a pressure release mechanism of the fixing device 9. FIG. 4A is a diagram illustrating a contact state where a predetermined pressure force is applied by the heating unit 10 being urged to the pressure roller 11, and FIG. 4B is a diagram illustrating a pressure release state where the pressure force of the heating unit 10 to the pressure roller 11 is weaker (including zero) than that in the contact state. The urging force is transmitted to the heating unit 10 via the flange member 28 by a pressure spring 33 urging a pressure plate 27, and the heating unit 10 is urged to the pressure roller 11 to apply a pressure force to the nip portion.

The pressure release mechanism of the fixing device 9 includes a front cam 34 that rotates in conjunction with the open and close of the front door 19, and a rear cam 35 that rotates in conjunction with the open and close of the rear door 20. Further, the pressure release mechanism of the fixing device 9 includes a pressure release arm 36 for adjusting the pressure plate 27 between the contact state and the pressure release state, and a pressure release arm holder 40 for holding the pressure release arm 36. The fixing device 9 is configured to be switched from the contact state in FIG. 4A to the pressure release state in FIG. 4B, by the front cam 34 and the rear cam 35 rotating in conjunction with the change of the front door 19 or the rear door 20 from the closed state to the open stated. FIG. 4B illustrates the pressure release state where both of the front door 19 and the rear door 20 are open, and both of the front cam 34 and the rear cam 35 are rotated. In a case where only one of the front door 19 and the rear door 20 is opened, the cam corresponding to the open door is in the rotated state. The front cam 34, the rear cam 35, the pressure release arm 36, and the pressure release arm holder 40 are arranged on each side of the fixing device 9 in a lengthwise direction.

The pressure release arm 36 may include a plurality of components, or may include a power transmission system such as a plurality of gears.

Figure 5:
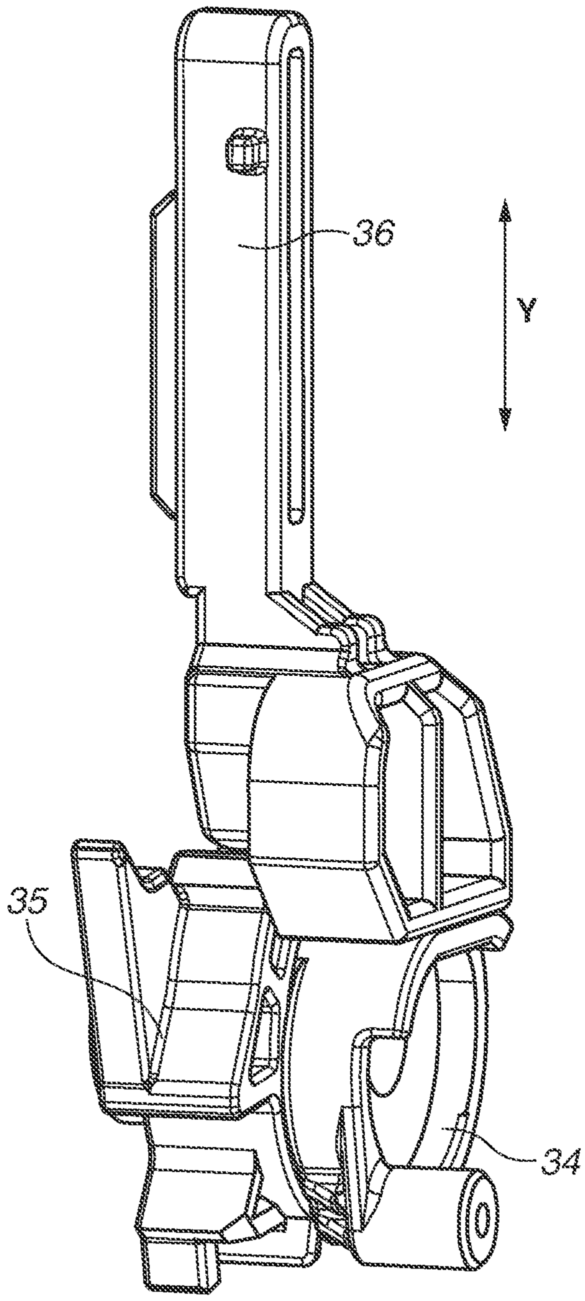
FIG. 5 is a perspective view of the pressure release mechanism of the fixing device according to the first exemplary embodiment.

FIG. 5 is a perspective view of the pressure release mechanism in the fixing device 9. The pressure release arm 36 contacts the front cam 34 and the rear cam 35 to convert a variation amount in a radial direction caused by the rotation of any of the front cam 34 and the rear cam 35 into a variation amount in a Y direction. In this way, the pressure plate 27 is pushed up by the pressure release arm 36 moving in the Y direction, so that the pressure force by the pressure spring 33 is to be adjusted.

Figure 6:
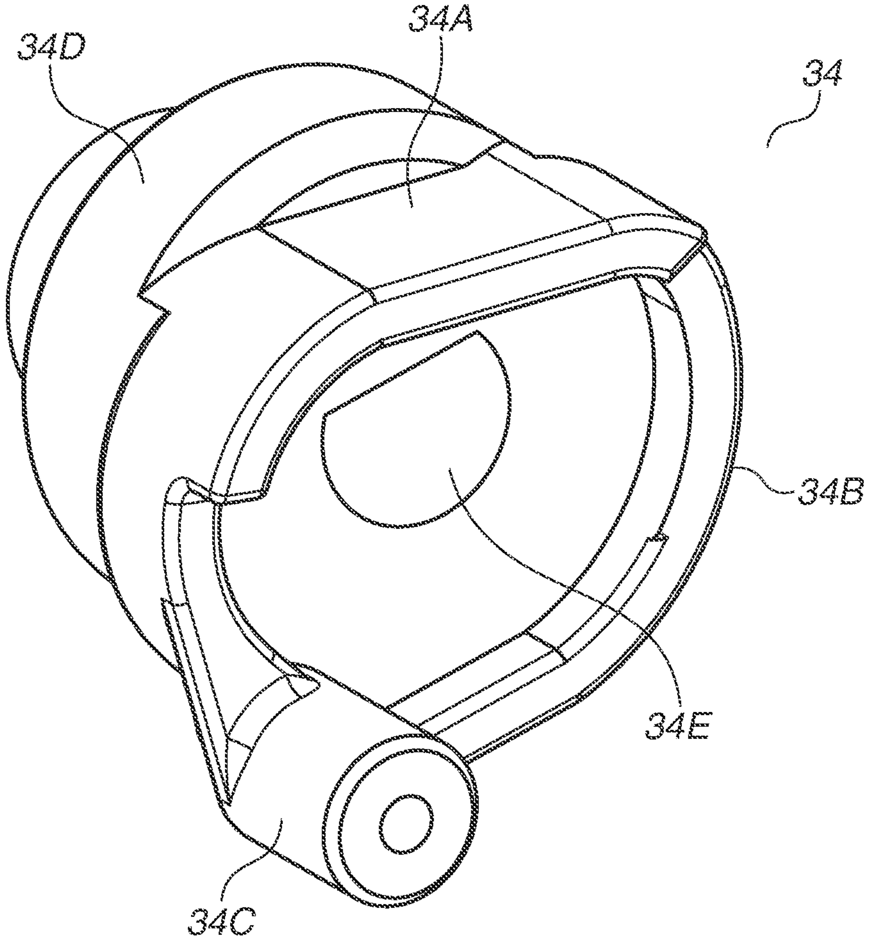
FIG. 6 is a diagram illustrating a front cam of the pressure release mechanism according to the first exemplary embodiment.
Figure 7:
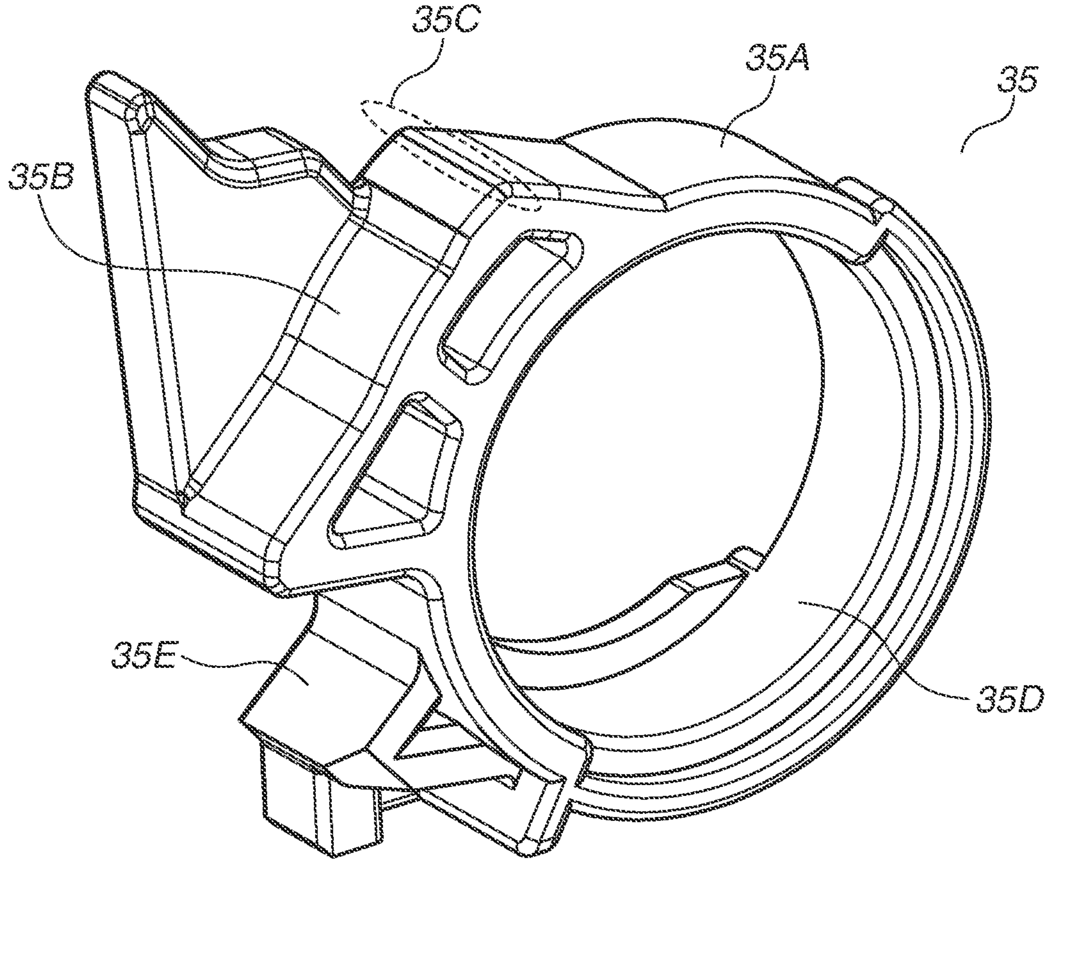
FIG. 7 is a diagram illustrating a rear cam of the pressure release mechanism according to the first exemplary embodiment.
Figure 8:
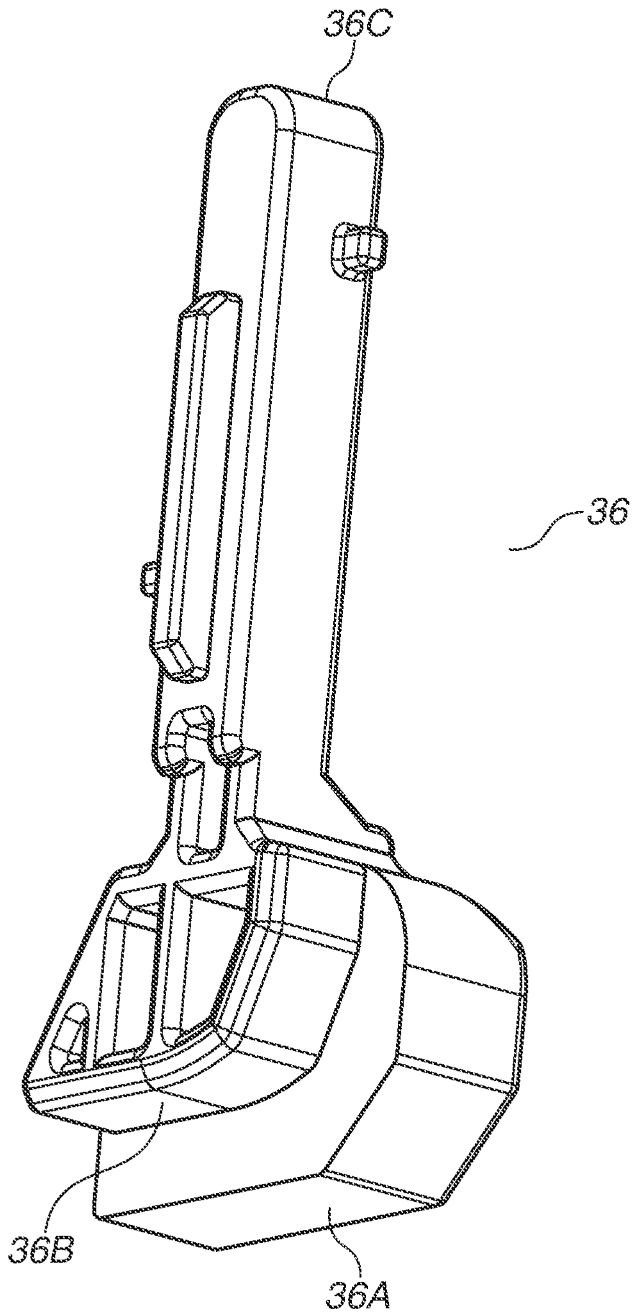
FIG. 8 is a diagram illustrating a pressure release arm of the pressure release mechanism according to the first exemplary embodiment.

FIGS. 6 to 8 are diagrams each illustrating details of a member of the pressure release mechanism, and FIG. 6 illustrates the front cam 34, FIG. 7 illustrates the rear cam 35, and FIG. 8 illustrates the pressure release arm 36. As illustrated in FIG. 6, the front cam 34 includes a surface 34A that contacts the pressure release arm 36 when the nip portion is in the contact state illustrated in FIG. 4A, and an arc portion 34B that contacts the pressure release arm 36 when the nip portion is in the pressure release state illustrated in FIG. 4B. The center of the arc portion 34B is coincident with the center of the rotational shaft of the cams, and the distance between the arc portion 34B and the rotational shaft of the cams is longer than the distance between the surface 34A and the rotational shaft of the cams. The front cam 34 includes a boss portion 34C to interlock with the open and close of the front door 19, and a bearing portion 34D with an approximately circular shape for supporting the rear cam 35.

As illustrated in FIG. 7, the rear cam 35 includes an arc portion 35A, an arc portion 35B, and an arc portion 35C. The arc portion 35A contacts the pressure release arm 36 in the contact state illustrated in FIG. 4A. The arc portion 35B contacts the pressure release arm 36 in the pressure release state illustrated in FIG. 4B. The arc portion 35C has a shape to apply a rotational force to the rear cam 35 by the pressing force at the fixing time.

The centers of the arc portion 35A and the arc portion 35B are coincident with the rotational shaft of the cams, and the arc portion 35B is larger than the arc portion 35A in curvature radius. The arc portion 35C is different from the rotational shaft of the cams in center position, and the distance between the rotational shafts of the arc portion 35C and the rear cam 35 is longer than the distance between the rotational shafts of the arc portion 35B and the rear cam 35. The rear cam 35 includes an inner circumferential surface 35D and an engaging portion 35E. The inner circumferential surface 35D has an approximately circular shape to fit a bearing portion 34D of the front cam 34 therein. The engaging portion 35E is provided to interlock with the open and close of the rear door 20. As illustrated in FIG. 8, the pressure release arm 36 includes a first contact surface 36A to contact the front cam 34, a second contact surface 36B to contact the rear cam 35, and a pressure plate contact portion 36C to contact the pressure plate 27.

Figure 9A:
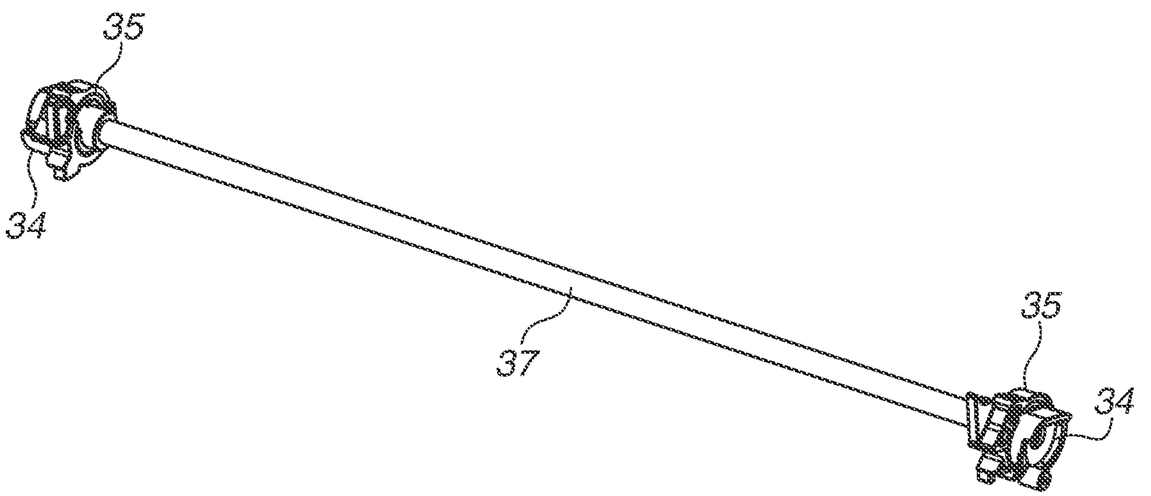
FIGS. 9A and 9B are diagrams illustrating a relationship between the front cam and the rear cam according to the first exemplary embodiment.
Figure 9B:
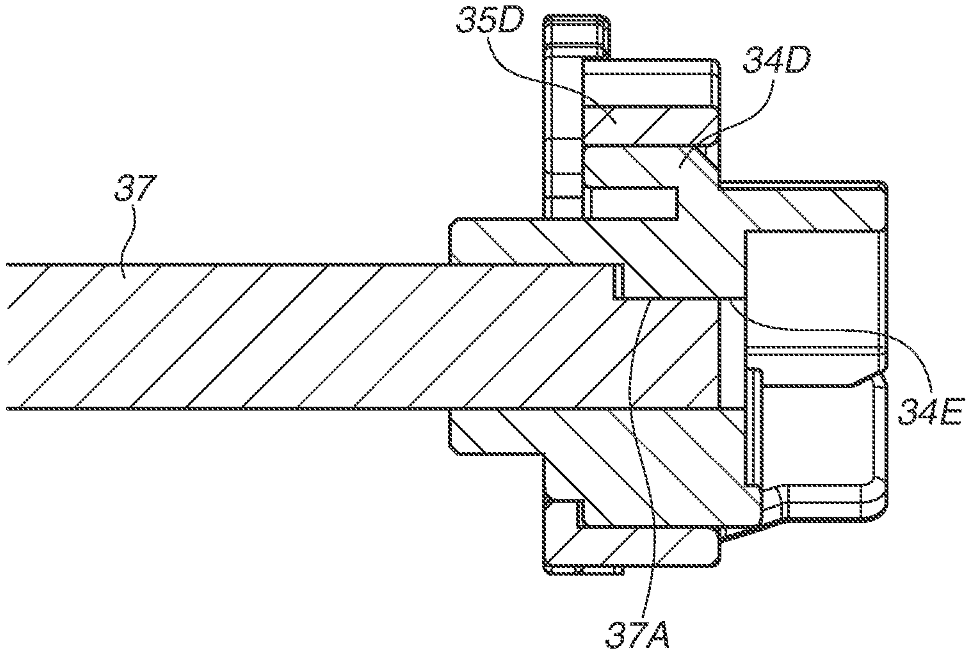

FIGS. 9A and 9B are diagrams illustrating a relationship between the front cam 34 and the rear cam 35. FIG. 9A is a perspective view, and FIG. 9B is a cross-section diagram cut along the rotational shaft center of the front cam 34 and the rear cam 35. As illustrated in FIG. 9A, the front cam 34 and the rear cam 35 are arranged on each side of the fixing device 9 in a lengthwise direction, and have a common rotational shaft. Because the rotational shaft of the two different types of cams is common, the two cams can be arranged in a space smaller than that when the rotational shafts are provided separately. As illustrated in FIG. 9B, a shaft member 37 is a shaft with an approximately circular basic cross-section shape, and a D-cut shape 37A is provided at a shaft end on each side. The front cam 34 is provided with a D-cut groove 34E, and the front cam 34 and the shaft member 37 interlock with each other at the D-cut portion, and the front cams 34 at the respective ends rotate in conjunction with each other. The inner circumferential surface 35D of the rear cam 35 is arranged on the bearing portion 34D of the front cam 34, and the rear cam 35 is configured to rotate independently from the front cam 34. Because the rear cam 35 rotating independently from the front cam 34 is not fastened to the shaft member 37, the rear cams 35 at the respective ends are configured to be rotatable independently from each other.

Like the relationship between the front cam 34 and the rear cam 35 illustrated in FIG. 9B, the front cam 34 also acts as the bearing of the rear cam 35. With this configuration, the front cam 34 and the rear cam 35 are provided in an overlapped manner in the rotational shaft direction of the cams, and thus the two cams can be arranged in a space smaller than that when the cams are not provided in an overlapped manner.

Figure 10:
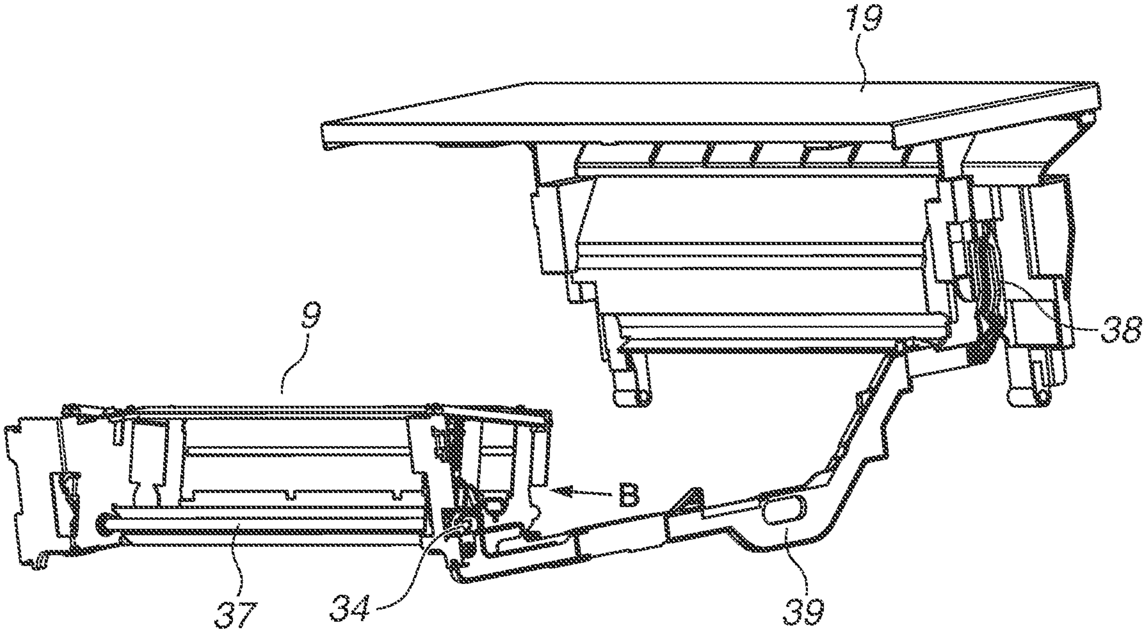
FIG. 10 is a perspective view illustrating a pressure release method performed in conjunction with an open and close of the front door according to the first exemplary embodiment.
Figure 11A:
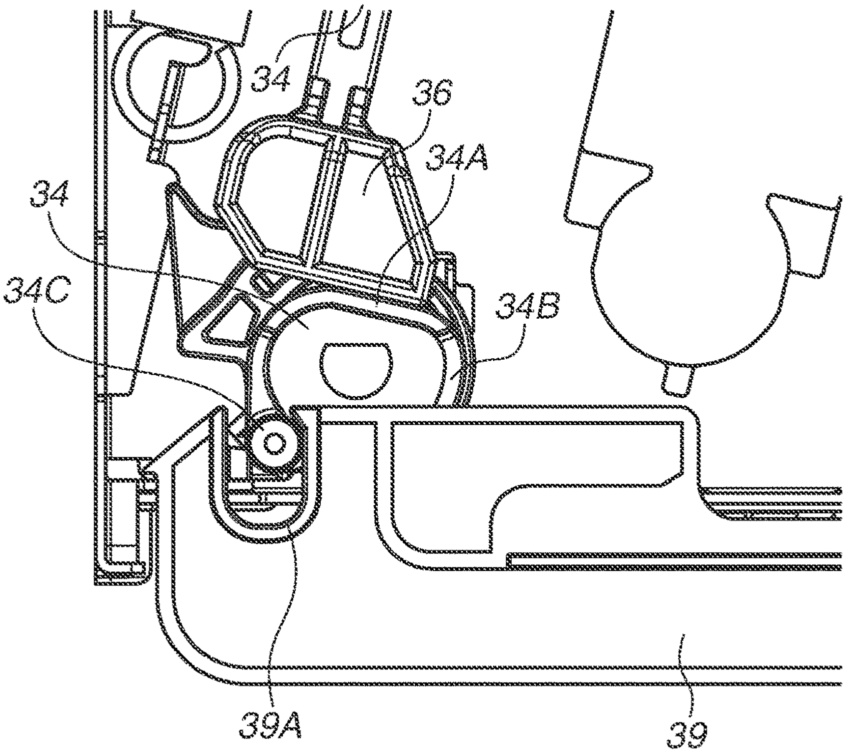
FIGS. 11A and 11B are diagrams illustrating an operation of the pressure release mechanism of the fixing device performed when the front door is opened and closed, according to the first exemplary embodiment.
Figure 11B:
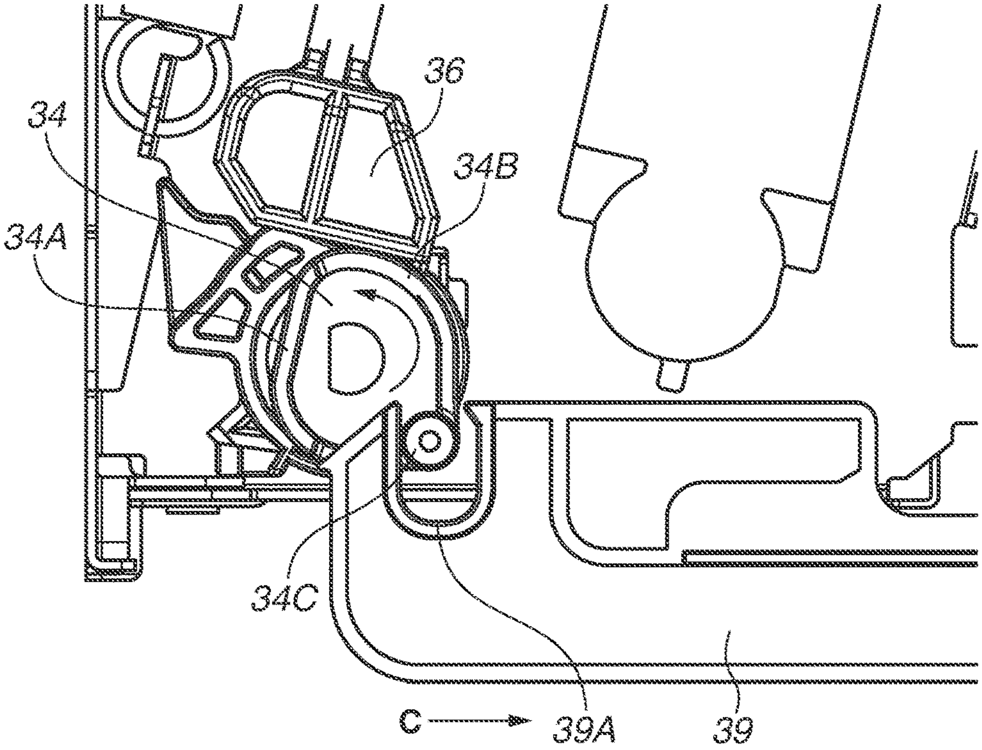

With reference to FIGS. 10, 11A, and 11B, the pressure release method interlocking with the front door 19 will be described. FIG. 10 is a perspective view illustrating the pressure release method performed interlocking with the front door 19, and FIGS. 11A and 11B are diagrams illustrating an operation of the pressure release mechanism of the fixing device 9 in conjunction with the open and close of the front door 19, when the pressure release mechanism is seen in a B direction in FIG. 10. In FIGS. 10 to 19, components not necessary to describe the pressure release mechanism operating interlocking with the front door 19 are not illustrated. The image forming apparatus 101 includes a connecting member to rotate the front cam 34 in conjunction with the open and close of the front door 19. The connecting member includes a front door connecting member 38 connecting with the front door 19, and a cam side connecting member 39 to contact and rotate the front cam 34. The front cam 34 is rotated in conjunction with the open and close of the front door 19 because the front door connecting member 38 and the cam side connecting member 39 are connected. With reference to FIGS. 11A and 11B, the operation of the pressure release mechanism of the fixing device 9 when the front door 19 is opened and closed will be described. In FIG. 11A, the front door 19 is closed, and the nip portion is in the contact state in FIG. 4A. In FIG. 11B, the front door 19 is open, and the nip portion is in the pressure release state in FIG. 4B. The cam side connecting member 39 includes an engaging hole 39A to engage with the boss portion 34C of the front cam 34. When the front door 19 is being opened from the closed state as in FIG. 11A toward the open state as in FIG. 11B, the cam side connecting member 39 moves toward the front side of the image forming apparatus 101 (C direction in FIG. 11B) interlocking with the front door 19. When the cam side connecting member 39 moves in the C direction, the boss portion 34C is pushed by the engaging hole 39A to rotate the front cam 34 in a counterclockwise direction. When the front door 19 is completely opened, the pressure release mechanism turns into the state in FIG. 11B. At this time, in the process of the front door 19 being opened, the surface of the front cam 34 contacting the pressure release arm 36 shifts from the surface 34A to the arc portion 34B. Because the distance of the arc portion 34B from the rotational shaft of the cams is longer than that of the surface 34A from the rotational shaft of the cams, the pressure release arm 36 is pushed up when the front door 19 is opened, and the nip portion is switched from the contact state in FIG. 4A to the pressure release state in FIG. 4B. At this time, because the rear cam 35 and the front cam 34 are configured to rotate independently from each other, the rear cam 35 has not rotated from the rotational phase in FIG. 11A when the front cam 34 is switched to the pressure release state.

Figure 12:
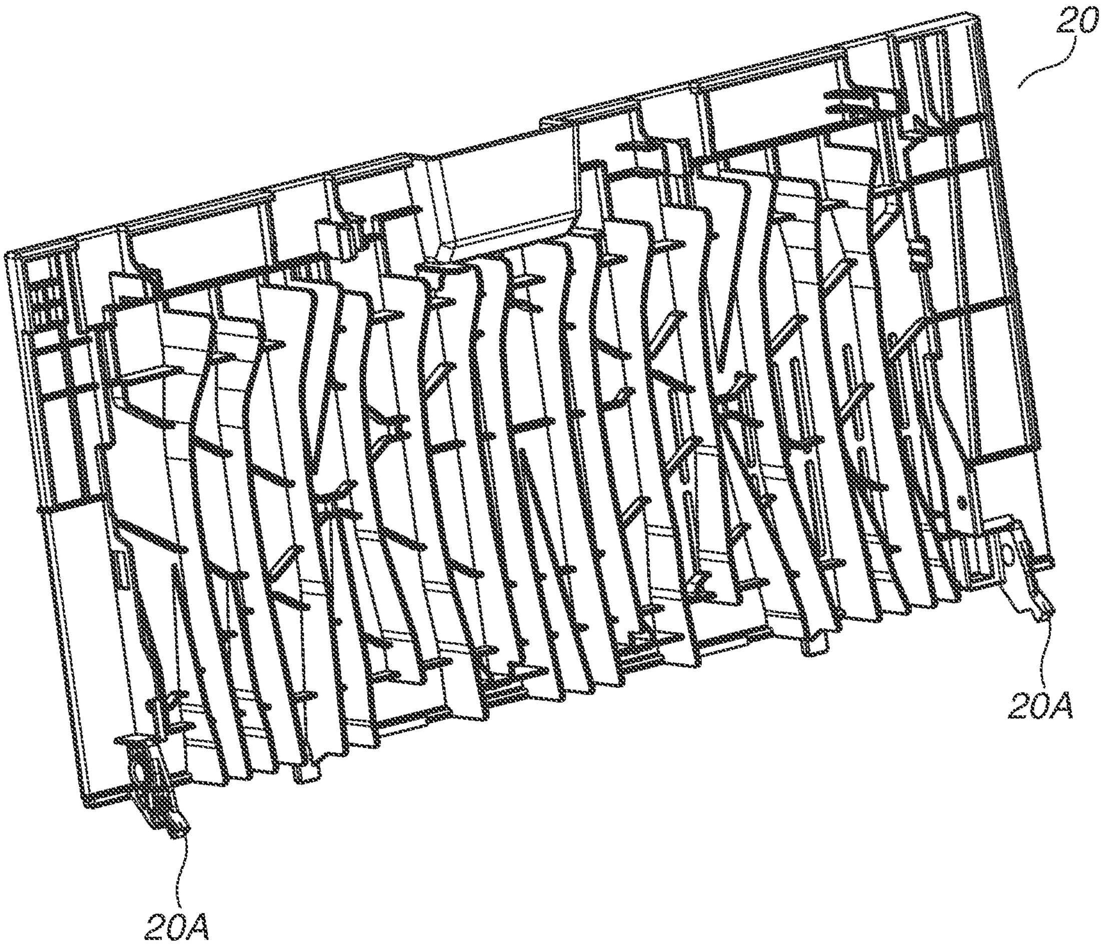
FIG. 12 is a perspective view illustrating a configuration of a rear door according to the first exemplary embodiment.

With reference to FIGS. 12, 13A, 13B, 13C, and 13D, the pressure release method performed interlocking with the rear door 20 will be described. FIG. 12 is a perspective view illustrating a configuration of the rear door 20, and FIGS. 13A, 13B, 13C, and 13D are cross-section diagrams cut at the rear cam portion, and illustrating the operation of the pressure release mechanism of the fixing device 9 in conjunction with the open and close of the rear door 20. As illustrated in FIG. 12, the rear door 20 includes protruding portions 20A at both ends of the rear door 20 to release the pressure of the fixing device 9. This is because the rear cams 35 arranged at both of the ends in the lengthwise direction of the fixing device 9 are configured to be rotatable independently from each other, and the rear cams 35 at both of the ends can be rotated by the corresponding two protruding portions 20A.

Figure 13A:
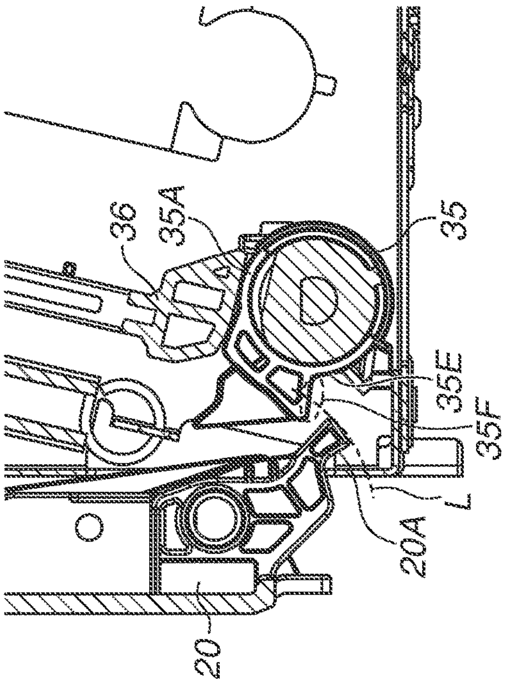
FIGS. 13A, 13B, 13C, and 13D are diagrams illustrating an operation of the pressure release mechanism of the fixing device performed when the rear door is opened and closed, according to the first exemplary embodiment.
Figure 13B:
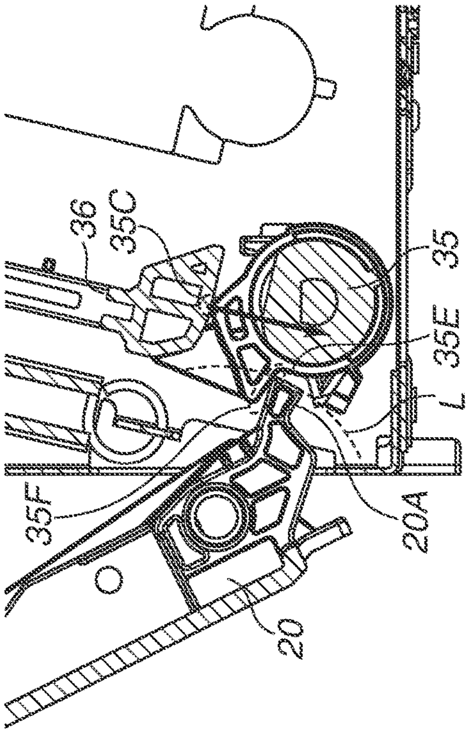
Figure 13C:
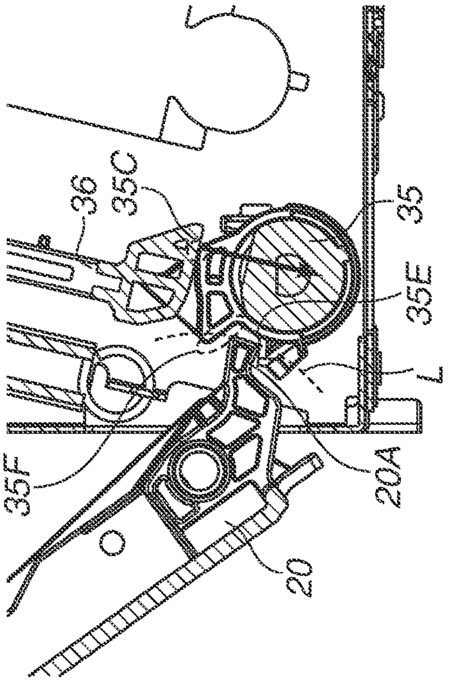
Figure 13D:
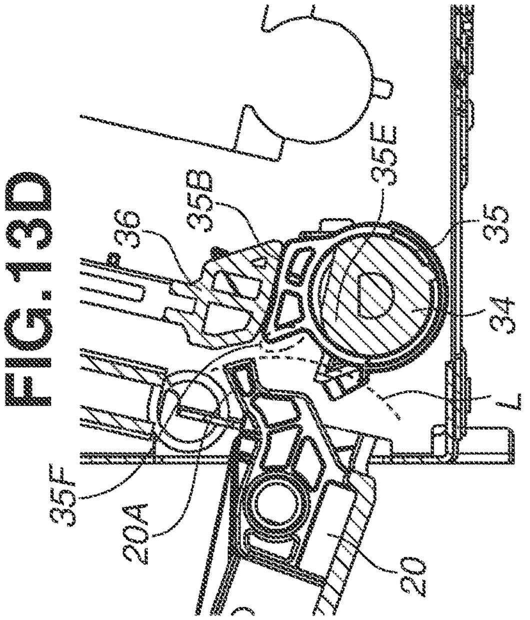

With reference to FIGS. 13A, 13B, 13C, and 13D, the operation of the pressure release mechanism of the fixing device 9 when the rear door 20 is opened and closed will be described. FIG. 13A illustrates a state where the rear door 20 is closed and the nip portion is in the contact state as in FIG. 4A. FIG. 13B illustrates a state where the pressure release arm 36 is in contact with the arc portion 35C, and the rear cam 35 receives a force to rotate in a direction in which the rear door 20 is closed, by an urging force of the pressure spring 33 transmitted from the pressure release arm 36. FIG. 13C illustrates a state where the pressure release arm 36 is in contact with the arc portion 35C, and the rear cam 35 receives a force to rotate in a direction in which the rear door 20 is opened by the urging force of the pressure spring 33 transmitted from the pressure release arm 36. As described above, since the arc center of the arc portion 35C is different from the rotational shaft center of the rear cam 35, the direction in which the rear cam 35 is rotated changes by the urging force of the pressure spring 33 transmitted from the pressure release arm 36, depending on the contact position of the arc portion 35C to the pressure release arm 36. FIG. 13D illustrates a state where the rear door 20 is open, and the nip portion is in the pressure release state. When the rear door 20 starts to open as illustrated in FIG. 13A, the protruding portion 20A of the rear door 20 rotates on a rotational locus L, and contacts a surface 35F of the engaging portion 35E of the rear cam 35. In this way, the rear cam 35 rotates in conjunction with the open and close of the rear door 20. A force is applied to the rear cam 35 in a direction in which the rear door 20 is closed until the state in FIG. 13B, because the direction of the pressure force applied to the rear cam 35 from the pressure release arm 36 is directing toward the rear door 20 from the rotational center of the rear cam 35. Accordingly, until the state in FIG. 13B, the protruding portion 20A of the rear door 20 continues to rotate the rear cam 35.

Then, when the rear cam 35 rotates beyond the state in FIG. 13B, and the contact position of the arc portion 35C and the pressure release arm 36 changes as illustrated in FIG. 13C, a force in an arrow direction illustrated in FIG. 13C is applied to the rear cam 35 by the pressure force from the pressure release arm 36. With this operation, the rear cam 35 is in a state where the rotation force to open the rear door 20 is applied. In this way, in and after the state in FIG. 13C, because the rear cam 35 is precedingly rotated by the pressure received from the pressure release arm 36, the rear cam 35 does not rotate due to the engagement of the rear door 20 and the rear cam 35. As illustrated in FIG. 13D, the rear cam 35 stops rotating at the arc portion 35B that has a circular shape concentric with the rotational shaft of the cams. With the preceding-rotation of the rear cam 35, the pressure force from the pressure release arm 36 is not applied to the user's operation at and after the preceding-rotation. At the same time, in a state where the rear door 20 is open, since the engagement of the protruding portions 20A of the rear door 20 and the engaging portion 35E of the rear cam 35 is released, the pressure force of the fixing device 9 is not applied to the protruding portion 20A of the rear door 20 via the pressure release arm 36. Thus, there is no possibility of creep of the protruding portions 20A of the rear door 20. In this state, because the rear cam 35 receives the pressure force from the pressure release arm 36 at a surface of the arc portion 35B, a certain degree of large contact area can be secured, and the force applied to a unit area is reduced. Accordingly, there is no possibility of creep of the rear cam 35. In the state in FIG. 13D, the surface 35F of the rear cam 35 stops with a gap kept to the rotational locus L of the protruding portions 20A of the rear door 20. Accordingly, when the rear door 20 is closed from the state in FIG. 13D, the protruding portion 20A is prevented from being caught by the surface 35F.

The arc portion 35B is not limited to a circle concentric with the rotational shaft of the cams, and may have any shape as long as the rotation of the pressure release arm 36 can be stopped by the rear cam 35 supporting the pressure release arm 36 as illustrated in FIG. 13D.

Because the rear cam 35 is arranged at each of the ends of the fixing device 9 in the lengthwise direction of the fixing device 9 and the protruding portion 20A of the rear door 20 is also arranged at each of the ends of the fixing device 9 in the lengthwise direction of the fixing device 9, the nip portion uniformly turns into the pressure release state when the rear door 20 is opened. Because the rear cam 35 and the front cam 34 are configured to rotate independently from each other, the front cam 34 keeps the rotation phase corresponding to the contact state in FIG. 13A, when the rear cam 35 turns into the pressure release state.

The rear cams 35 arranged at both of the ends of the fixing device 9 in the lengthwise direction are configured to rotate independently from each other. With this configuration, there are following advantages compared with a case where the rear cams 35 at both of the ends rotate in conjunction with each other. In the case where the rear cams 35 at both of the ends rotate in conjunction with each other, the pressure release operation is performed only by one of the rear cams 35 contacting the corresponding protruding portion 20A of the rear door 20 first when timings at which the protruding portions 20A of the rear door 20 contact the rear cams 35 at both of the ends are different, due to the variation of components or the like. Thus, because the pressure force of the fixing device 9 acts on the rear cam 35 at one end, the user's operation force increases. On the other hand, in the configuration in which the rear cams 35 at both of the ends rotate independently from each other, the protruding portions 20A of the rear door 20 contact the rear cams 35 at both of the ends without fail. Accordingly, because the pressure release operation is performed by the rear cams 35 at both of the ends and the pressure force of the fixing device 9 is divided to both of the ends, the user's operation force becomes smaller and more stable than that when the rear cams 35 at both of the ends rotate in conjunction with each other.

The components of the fixing device 9 can be arranged in a small space with a simple configuration by arranging the rotation centers of the rear cams 35 and the rotation centers of the front cams 34 coaxially, and enabling the rear cams 35 arranged at both of the ends of the fixing device 9 in the lengthwise direction to rotate independently from each other and to rotate independently from the front cams 34.

The configuration according to the present exemplary embodiment can provide an image forming apparatus capable of achieving reductions of apparatus size and cost, and a stable pressure release mechanism.

Figure 14:
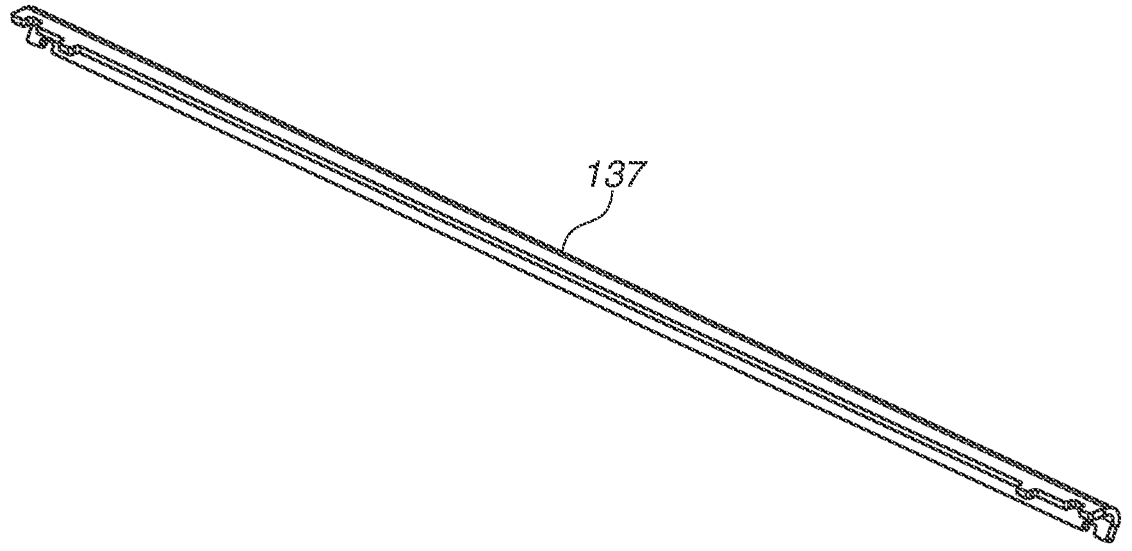
FIG. 14 is a diagram illustrating a shape of a shaft member according to a second exemplary embodiment.
Figure 15:
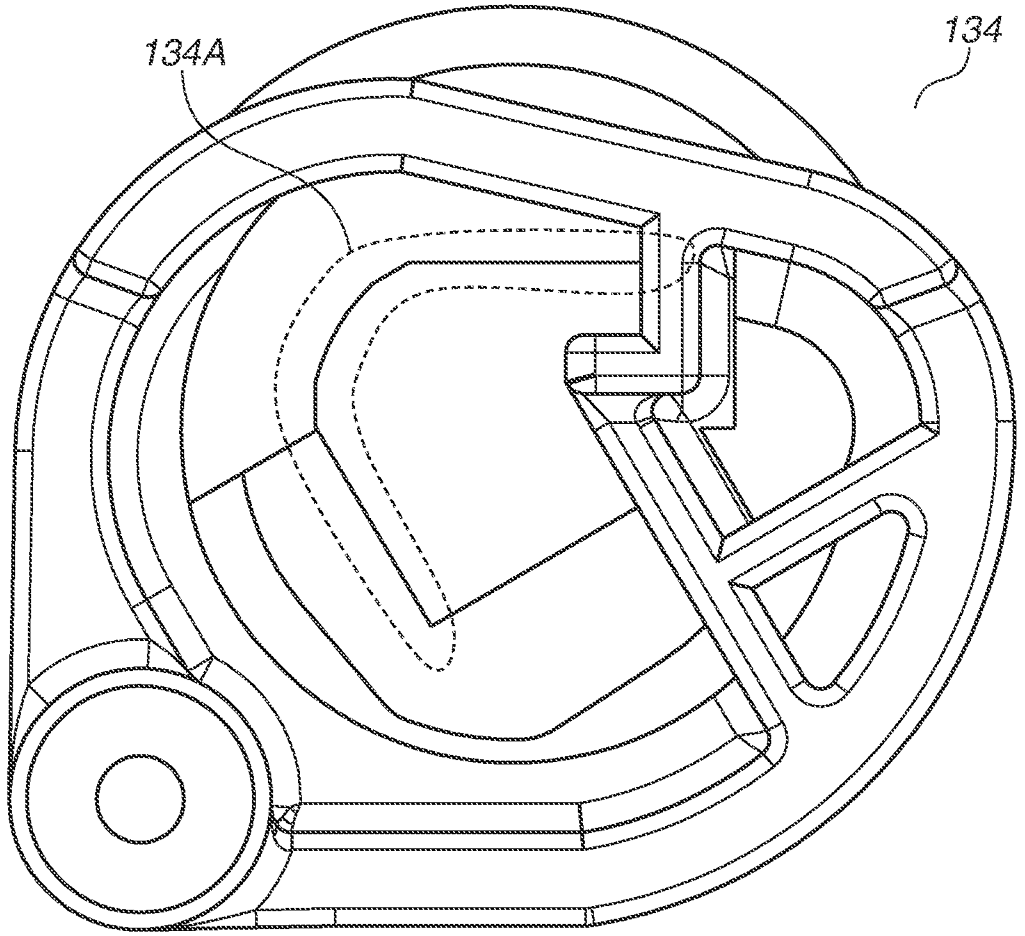
FIG. 15 is a diagram illustrating a shape of a front cam according to the second exemplary embodiment.
Figure 16:
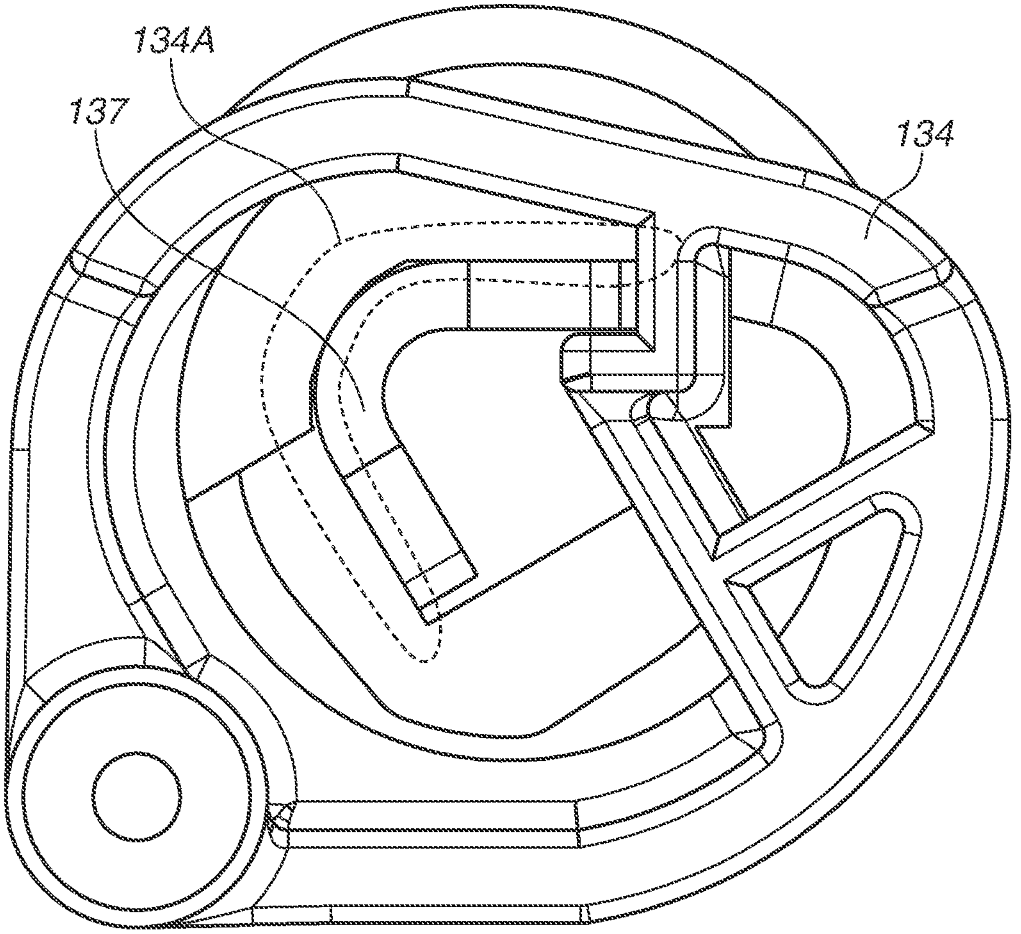
FIG. 16 is a side view illustrating an interlocking mechanism between the shaft member and the front cam according to the second exemplary embodiment.

With reference to FIGS. 14 to 16, a second exemplary embodiment according to the present disclosure will be described. In the present exemplary embodiment, the descriptions of the portions common with the first exemplary embodiment are omitted. The present exemplary embodiment is different from the first exemplary embodiment in the configuration of a shaft member 137 for interlocking front cams 134 on both ends in the lengthwise direction.

FIG. 14 is a diagram illustrating a shape of the shaft member 137, FIG. 15 is a diagram illustrating a shape of the front cam 134, and FIG. 16 is a side view illustrating an interlocking configuration of the shaft member 137 and the front cam 134. With reference to FIG. 14, the shaft member 137 is an approximately V-shaped rotational shaft formed by bending a sheet metal. The angle of the bending portion of the shaft member 137 is less than 90°. With reference to FIG. 15, the front cam 134 includes an engaging portion 134A configured to engage with an approximately V-shaped portion, which is a cross-section shape of the shaft member 137. With reference to FIG. 16, the front cam 134 and the shaft member 137 are configured to rotate in an interlocked manner, by the engaging portion 134A of the front cam 134 and the V-shaped portion, which is a cross-section shape of the shaft member 137, engaging with each other.

As described above, because the shaft member 137 is a rotational shaft formed by bending the sheet metal in the V-shape at only one portion, it is possible to reduce the cost compared with the turning processed shaft with an approximately circular shape in the first exemplary embodiment.

Figure 17:
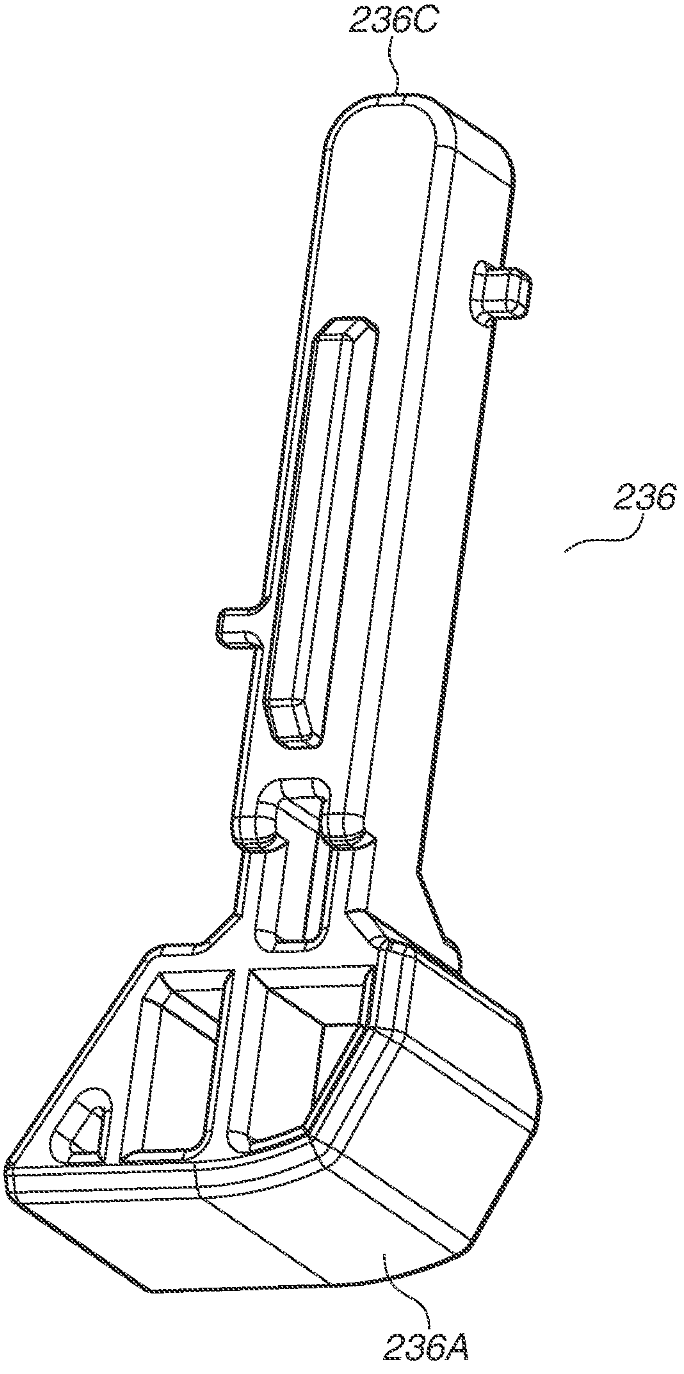
FIG. 17 is a diagram illustrating a pressure release arm of a pressure release mechanism according to a third exemplary embodiment.
Figure 18A:
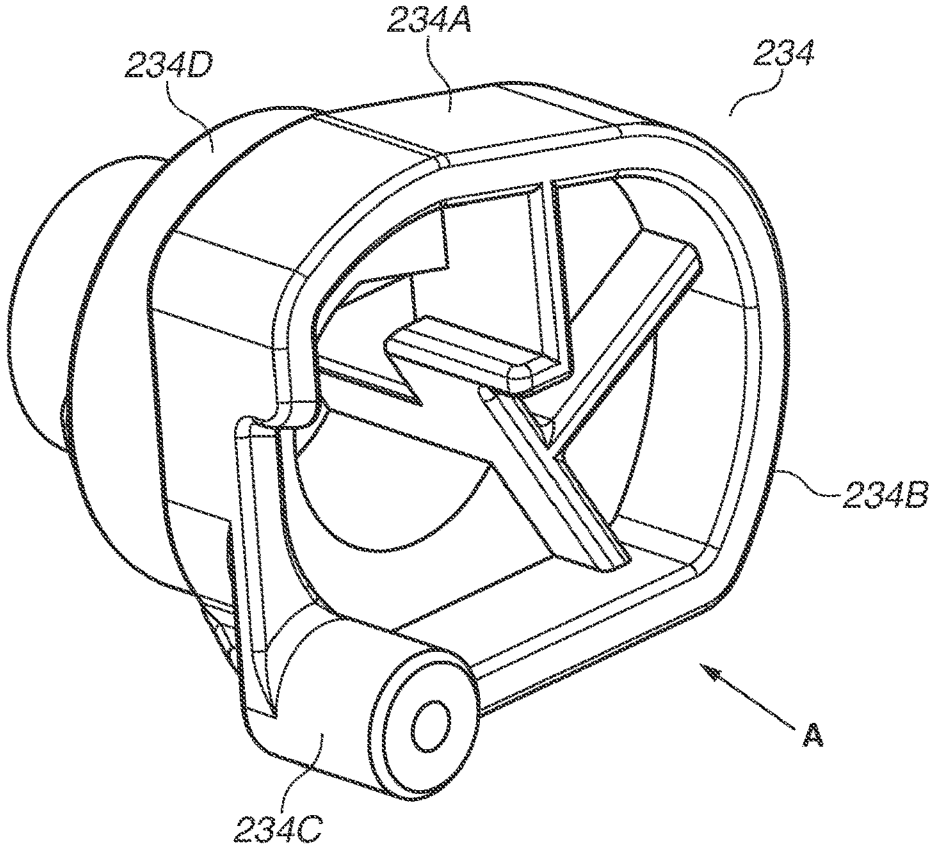
FIGS. 18A and 18B are diagrams illustrating a front cam of the pressure release mechanism according to the third exemplary embodiment.
Figure 18B:
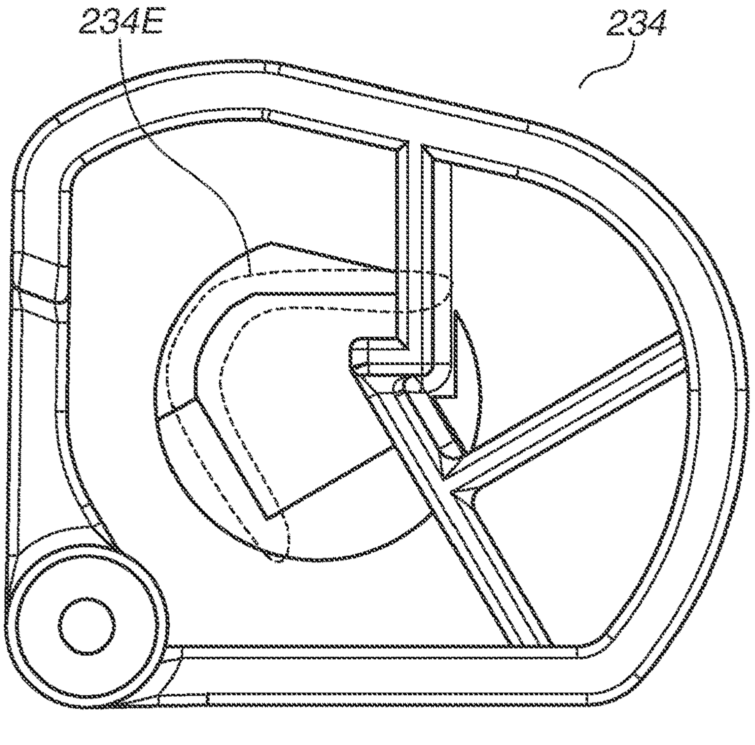
Figure 19:
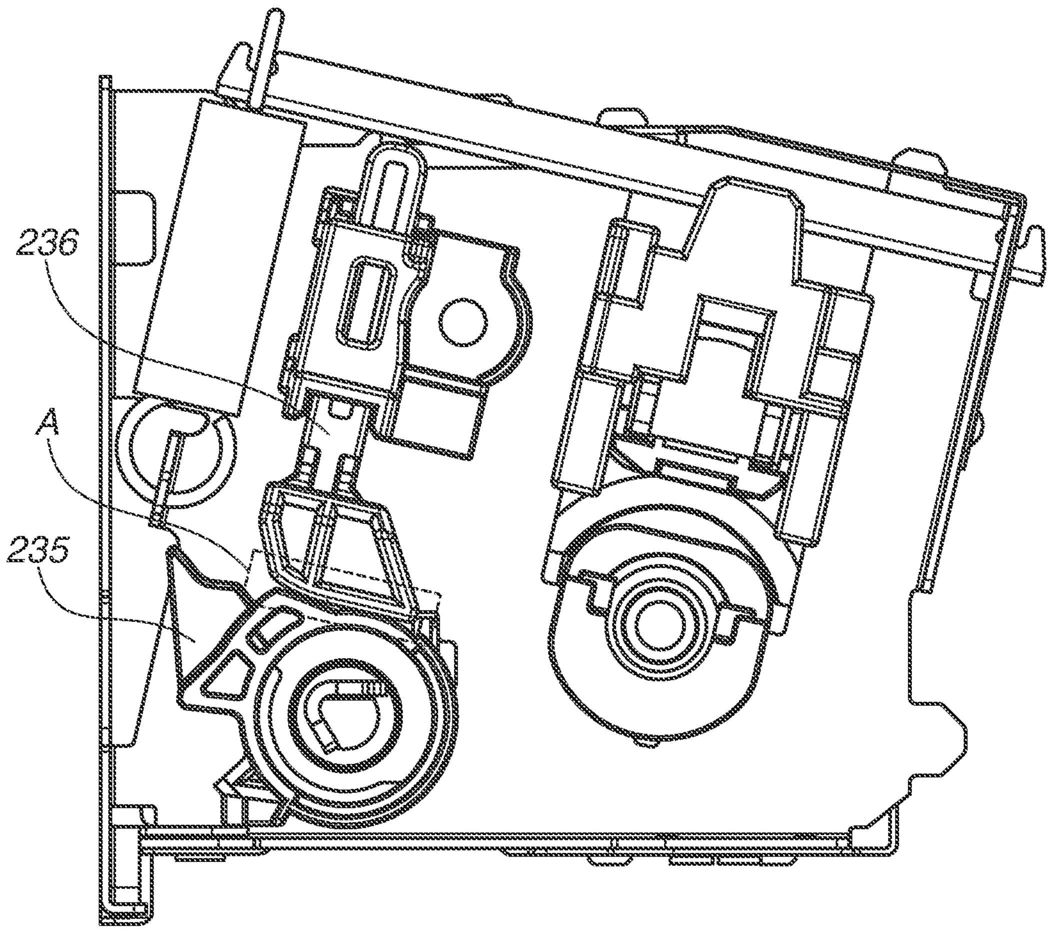
FIG. 19 is a schematic diagram illustrating a pressure application mechanism and the pressure release mechanism of a fixing device according to the third exemplary embodiment.

With reference to FIGS. 17 to 19, a third exemplary embodiment according to the present disclosure will be described. In the present exemplary embodiment, the descriptions of the portions common with the first exemplary embodiment are omitted. The configuration of the shaft member to interlock front cams 234 provided at both of the ends in the lengthwise direction thereof is similar to that in the second exemplary embodiment, and the description thereof is omitted. The present exemplary embodiment is different from the first and second exemplary embodiments in shapes of a surface 236A of a pressure release arm 236, and a surface 234A and an arc portion 234B of the front cam 234.

FIG. 17 is a diagram illustrating a shape of the pressure release arm 236. The pressure release arm 236 includes the common surface 236A to contact both of the front cam 234 and a rear cam 235. A pressure plate contact portion 236C to contact the pressure plate 27 is similar to that in the first exemplary embodiment.

FIGS. 18A and 18B are diagrams illustrating a shape of the front cam 234, and FIG. 18A is a perspective view, and FIG. 18B is a side view when the front cam 234 in FIG. 18A is seen in an A direction. The front cam 234 includes the surface 234A that contacts the surface 236A of the pressure release arm 236 in the contact state in FIG. 4A, and the arc portion 234B that contacts the surface 236A of the pressure release arm 236 in the pressure release state in FIG. 4B. The arc portion 234B has a circular shape concentric with the rotational shaft of the cams, and the distance between the arc portion 234B and the rotational shaft of the cams is longer than the distance between the surface 234A and the rotational shaft of the cams. A boss portion 234C to interlock with the open and close of the front door, and a bearing portion 234D with an approximately circular shape to support the rear cam 235 are similar to those in the first exemplary embodiment.

FIG. 19 is a schematic diagram illustrating a pressure application mechanism and a pressure release mechanism of the fixing device 9 according to the present exemplary when the fixing device 9 in FIG. 2 is seen in the A direction. In FIG. 19, the front cam 234 is not illustrated for the simplification of the description. As illustrated by an A portion in FIG. 19, the pressure release arm 236 and the rear cam 235 do not overlap when seen from the side surface.

In the present exemplary embodiment, because the shaft member is a rotational shaft formed by bending the sheet metal in the V-shape at only one portion, similar to that in the second exemplary embodiment, it is possible to reduce the cost compared with the first exemplary embodiment.

In the present exemplary embodiment, the surface 236A of the pressure release arm 236 has a cam shape common to the front cam 234 and the rear cam 235. With this configuration, because the pressure release arm 236 and the rear cam 235 do not overlap when seen from the side surface, it is not necessary to assemble the rear cam 35 while lifting up the pressure release arm 36 to avoid the pressure release arm 36 like the configuration according to the first exemplary embodiment when the rear cam 35 is assembled. In the present exemplary embodiment, because the rear cam 235 can be assembled without avoiding the pressure release arm 236, it is possible to improve the assemblability compared with the first exemplary embodiment.

With reference to FIGS. 20, 21, and 22A to 22E, a fourth exemplary embodiment according to the present disclosure will be described. In the present exemplary embodiment, the descriptions of the portions common with the first and second exemplary embodiments are omitted. The configuration of the shaft member to interlock the front cams provided at both of the ends of the shaft member is similar to that according to the second exemplary embodiment, and the description of the configuration is omitted. The present exemplary embodiment is different from the first and second exemplary embodiments in the configuration of the pressure release mechanism of the fixing device 9 when a rear door 320 is opened and closed.

Figure 20:
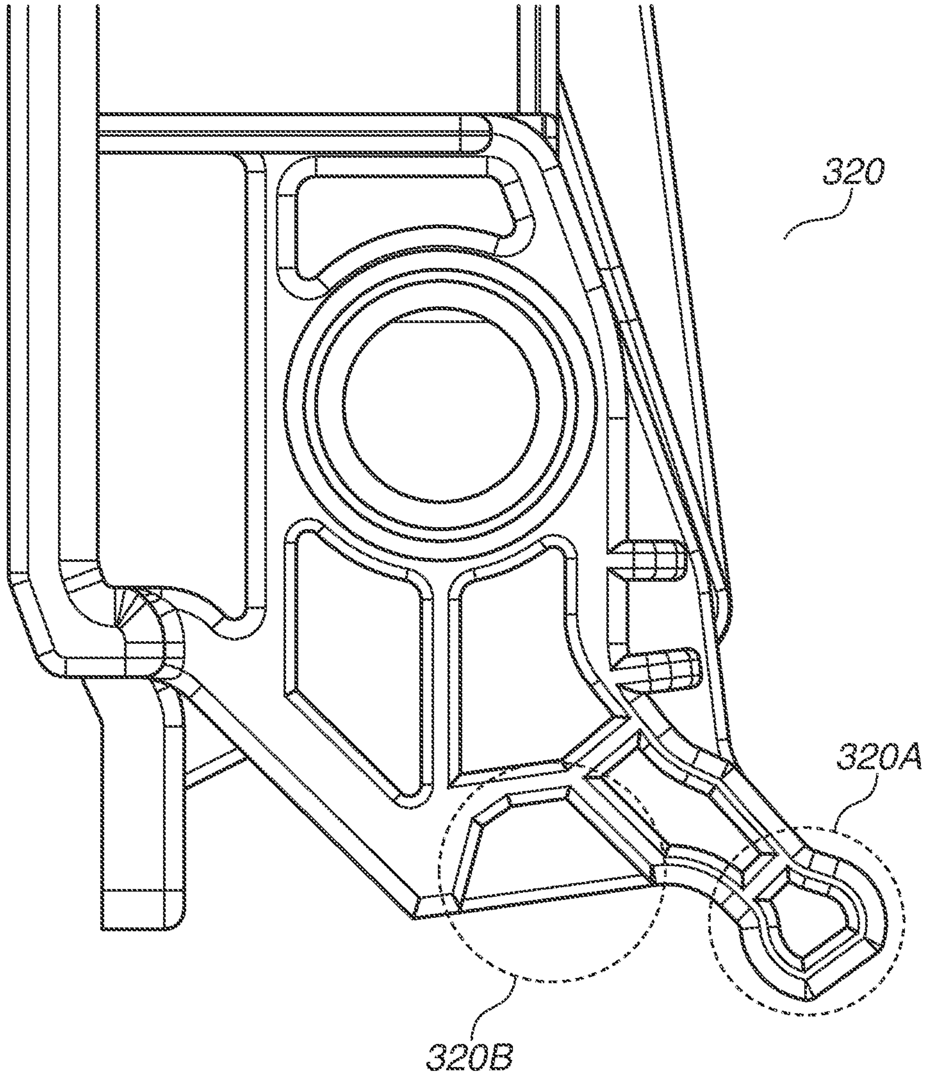
FIG. 20 is a diagram illustrating a shape of a protruding portion of a rear door for rotating a rear cam according to a fourth exemplary embodiment.

FIG. 20 is a diagram illustrating a shape of a protruding portion of the rear door 320 to rotate a rear cam 335. The rear door 320 includes a first engaging portion 320A and a second engaging portion 320B for engaging with the rear cam 335 to rotate the rear cam 335.

Figure 21:
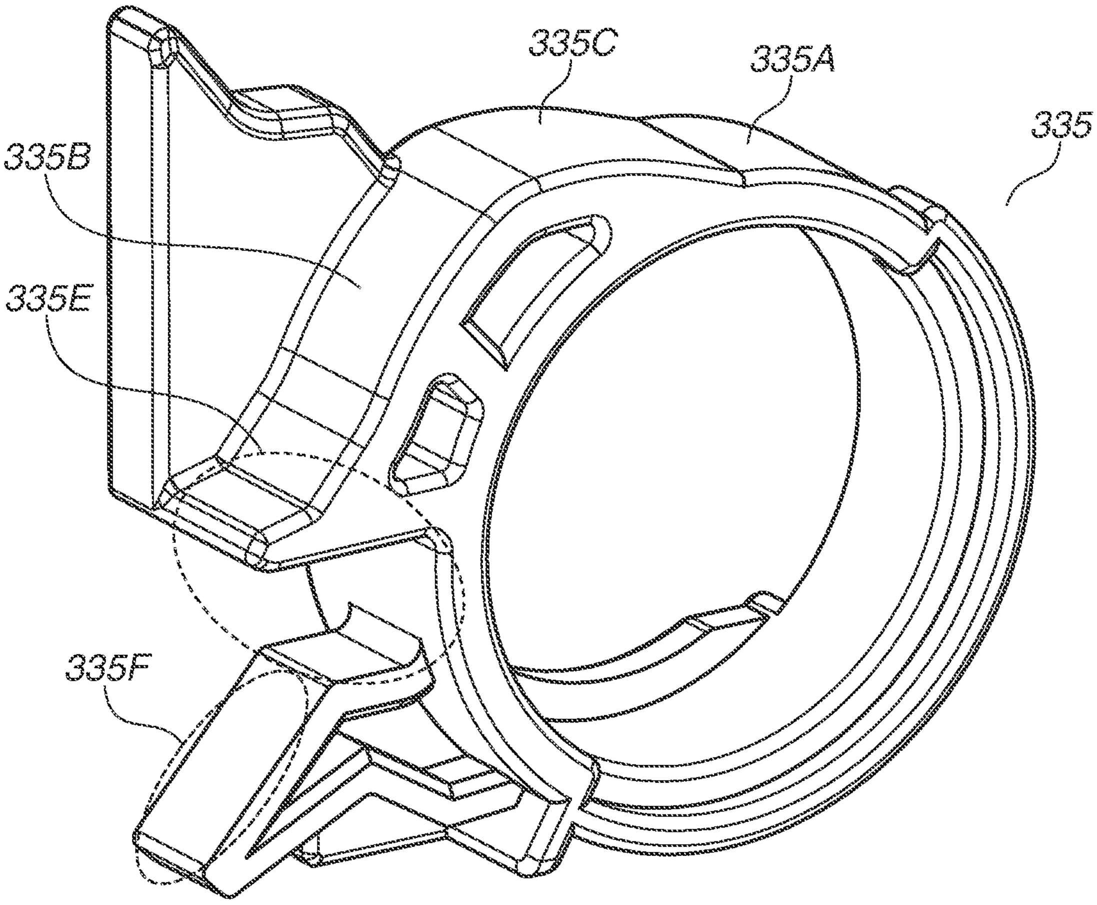
FIG. 21 is a diagram illustrating a shape of the rear cam according to the fourth exemplary embodiment.

FIG. 21 is a diagram illustrating a shape of the rear cam 335. The rear cam 335 includes an arc portion 335A that contacts the pressure release arm 336 in the contact state in FIG. 4A, an arc portion 335B that contacts a pressure release arm 336 in the pressure release state in FIG. 4B, and an arc portion 335C that smoothly connects the arc portion 335A and the arc portion 335B. The arc portion 335A and the arc portion 335B each have a circular shape concentric with the rotational shaft of the cams, and the arc portion 335C has a center position of the arc different from the rotational shaft center position of the rear cam 335. The rear cam 335 further includes a first engaged portion 335E to be engaged with the first engaging portion 320A of the rear door 320, and a second engaged portion 335F to be engaged with the second engaging portion 320B.

Figure 22A:
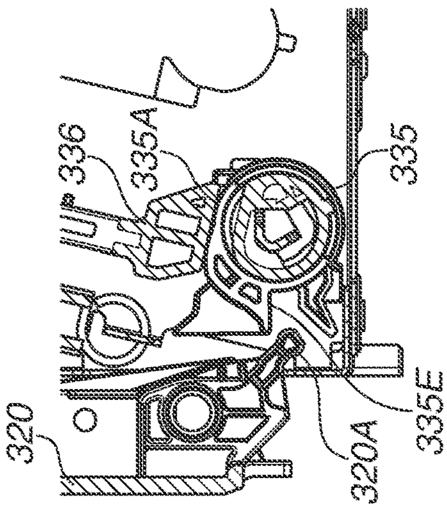
FIGS. 22A to 22E are diagrams illustrating a pressure release method performed in conjunction with an open and close of the rear door according to the fourth exemplary embodiment.
Figure 22B:
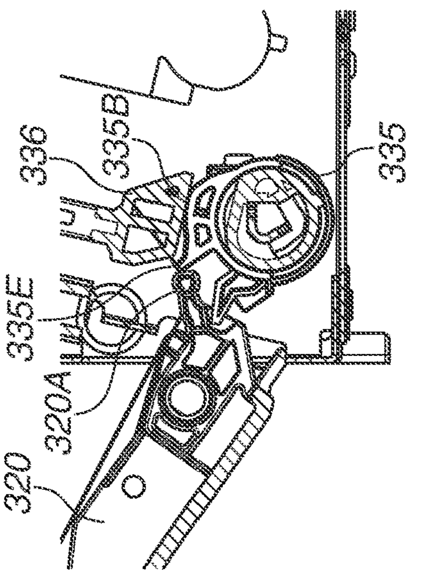
Figure 22C:
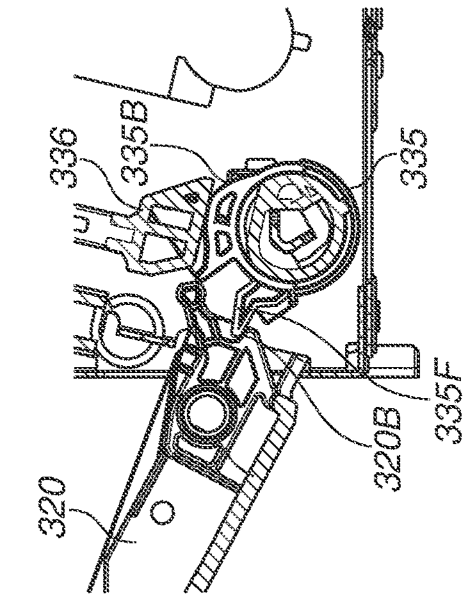
Figure 22D:
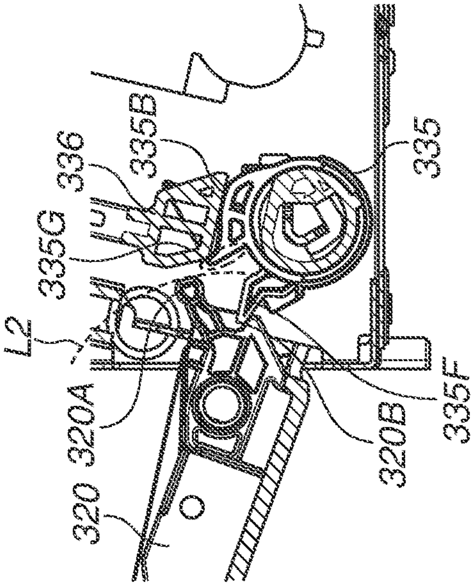

FIGS. 22A to 22E are diagrams illustrating a pressure release method performed in conjunction with the open and close of the rear door 320. In FIG. 22A, the rear door 320 is closed and the nip portion is in the contact state in FIG. 4A. FIG. 22B illustrates a timing at which the rotation of the rear cam 335 by the first engaging portion 320A of the rear door 320 ends. FIG. 22C illustrates a timing at which the rotation of the rear cam 335 by the second engaging portion 320B of the rear door 320 starts. In FIG. 22D, the rear door 320 is open, and the nip portion is in the pressure release state in FIG. 4B. When the rear door 320 starts opening from the state in FIG. 22A, the first engaging portion 320A of the rear door 320 contacts the surface of the first engaged portion 335E of the rear cam 335 to rotate the rear cam 335 up to the state in FIG. 22B. In the state in FIG. 22B, the first engaging portion 320A of the rear door 320 and the first engaged portion 335E of the rear cam 335 disengages. At this time, because the rear cam 335 is in contact with the pressure release arm 336 at the arc portion 335B with a circular shape concentric with the rotational shaft of the cams, the rear door 320 rotates to the state in FIG. 22C, while the rear cam 335 stops rotating. From the state in FIG. 22C, the second engaging portion 320B of the rear door 320 contacts the second engaged portion 335F of the rear cam 335 to rotate the rear cam 335 to the state in FIG. 22D, and to rotate the nip portion to the pressure release state in FIG. 4B. In the state in FIG. 22D, a front edge 335G of the rear cam 335 stops with a gap kept to a rotational locus L2 of the first engaging portion 320A of the rear door 320. Accordingly, when the rear door 320 is closed from the state in FIG. 22D, the first engaging portion 320A is configured to avoid being caught by the front edge 335G.

In the state in FIG. 22B, when the first engaging portion 320A of the rear door 320 and the first engaged portion 335E of the rear cam 335 disengage, the state of the rotation of the rear cam 335 is not limited to the stopped state. For example, the rear cam 335 may have a shape to be rotated in a direction in which the second engaged portion 335F approaches the second engaging portion 320B of the rear door 320.

Figure 22E:
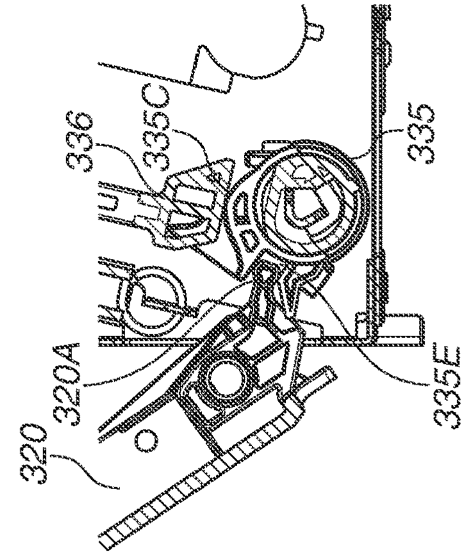

FIG. 22E is a diagram illustrating a timing at which a preceding-rotation of the rear cam 335 preceding the rotation caused by the engagement of the rear door 320 starts when the rear door 320 is closed from the open state. When the rear door 320 is closed from the state in FIG. 22D, as in the state in FIG. 22E, the preceding-rotation of the rear cam 335 starts in a state where the rear cam 335 contacts the pressure release arm 336 at the arc portion 335C of the rear cam 335. This is because the pressure force applied to the rear cam 335 from the pressure release arm 336 is directed toward the rear door 320 more than the rotation center of the rear cam 335, and the rear cam 335 receives a force in a direction in which the rear door 320 is closed. As in FIG. 22E, at the timing at which the preceding-rotation is caused, the gap between the first engaging portion 320A and the first engaged portion 335E is very small or the first engaging portion 320A and the first engaged portion 335E are already engaged. In the present exemplary embodiment, similar to the second exemplary embodiment, because the shaft member is a rotational shaft formed by bending a sheet metal in the V-shape only at one position, it is possible to reduce the cost compared with the first exemplary embodiment. In the present exemplary embodiment, the rear door 320 is provided with the first engaging portion 320A and the second engaging portion 320B, and the second engaging portion 320B rotates the front edge 335G of the rear cam 335 to the state with the gap kept with respect to the rotational locus L2 of the first engaging portion 320A. With this configuration, in the process of opening the rear door 320, the rear door 320 does not move over the preceding-rotation, different from the first and second exemplary embodiments. Thus, the force required to open the rear door 320 is smaller than that in the first exemplary embodiment, and the operability is improved. Further, in the present exemplary embodiment, in the process of closing the rear door 320, at the timing at which the preceding-rotation of the rear cam 335 starts, the space between the first engaging portion 320A and the first engaged portion 335E is very small or the first engaging portion 320A and the first engaged portion 335E are already engaged. Thus, it is possible to reduce the collision energy of the rear cam 335 by the preceding-rotation against the first engaging portion 320A of the rear door 320, and to decrease the collision noise, compared with the first exemplary embodiment.

The exemplary embodiments of the present disclosure are specifically described above, but the present disclosure is not limited to the above-described exemplary embodiments, and the exemplary embodiments can be modified in various manners within the technical concept according to the present disclosure.

According to the exemplary embodiments of the present disclosure, in an image forming apparatus including a pressure force release mechanism of a fixing device operating in conjunction with an open and close of a plurality of doors, it is possible to provide the image forming apparatus in a smaller size.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-134629, filed Aug. 26, 2022, which is hereby incorporated by reference herein in its entirety.

What is claimed is:

1. An image forming apparatus comprising:

a fixing unit configured to fix a toner image formed on a sheet onto the sheet, and including a heating unit configured to heat the sheet, a pressure roller configured to press the heating unit to form a fixing nip portion to fix the toner image onto the sheet and to apply a predetermined pressure force to the fixing nip portion when the toner image is fixed, a first cam member and a second cam member each having a rotational center, and a pressure force release unit configured to switch a position of the heating unit by a rotation of the first cam member or the second cam member, between a first position at which the predetermined pressure force is applied to the fixing nip portion, and a second position at which the predetermined pressure force applied to the fixing nip portion is reduced or released; and an apparatus main body including first and second doors configured to be opened and closed, and configured to contain the fixing unit, wherein the first cam member rotates in conjunction with an open and close of the first door, and the second cam member rotates in conjunction with an open and close of the second door, and wherein the rotational center of the second cam member is arranged coaxially with the rotational center of the first cam member.

2. The image forming apparatus according to claim 1, wherein the first cam member is provided at each end of the fixing unit in a lengthwise direction of the fixing unit, wherein the second cam member is provided at each end of the fixing unit in the lengthwise direction of the fixing unit, and wherein the fixing unit includes a shaft member connecting two first cam members.

3. The image forming apparatus according to claim 2, wherein the second door includes, at each end of the fixing unit in the lengthwise direction of the fixing unit, an engaging portion configured to engage with the second cam member to rotate the second cam member, and wherein the second cam member includes an engaged portion to be engaged with the engaging portion.

4. The image forming apparatus according to claim 3, wherein the apparatus main body includes a shaft member configured to interlock the open and close of the first door and the rotation of the first cam members, wherein two first cam members rotate in conjunction with the open and close of the first door with the same phase by a connection with the shaft member of the apparatus main body, and wherein two second cam members are rotatable independently from the first cam members.

5. The image forming apparatus according to claim 4, wherein each of the first cam members includes a protruding portion with an approximately circular shape and protruding in a rotational shaft direction when seen in the rotational shaft direction, wherein each of the second cam members includes a hole portion with an approximately circular shape when seen in the rotational shaft direction, wherein the hole portion and the protruding portion are almost equal in diameter within a predetermined amount, and wherein the second cam members are rotatable independently from the first cam members, in a state where the protruding portion and the corresponding second cam member are overlapped in the rotational shaft direction of the second cam members.

6. The image forming apparatus according to claim 3, wherein the fixing unit includes a pressure plate configured to apply a pressure force to the fixing nip portion, wherein the pressure force release unit includes a moving member including a first contact surface configured to contact the first cam member, a second contact surface configured to contact the second cam member, and a third contact surface configured to contact the pressure plate, and wherein the position of the heating unit is switched between the first position and the second position by changing positions of the moving member and the pressure plate due to the rotation of the first cam member or the second cam member.

7. The image forming apparatus according to claim 6, wherein the first contact surface and the second contact surface are located at different distances from the third contact surface.

8. The image forming apparatus according to claim 6, wherein the first contact surface and the second contact surface are located at the same distance from the third contact surface.

9. The image forming apparatus according to claim 6, wherein the moving member is composed of a single component.

10. The image forming apparatus according to claim 6,
wherein, when the heating unit is at the first position, the first door is in a closed state, and the second door is in a closed state, and
wherein, when the heating unit is at the second position, at least one of the first door and the second door is in an open state.

11. The image forming apparatus according to claim 10,
wherein the second cam member includes a contacted surface configured to contact the moving member, and a first arc portion located within a range larger in distance than the contacted surface from a rotational shaft center of the second cam member and having a center different in position from the rotational shaft center of the second cam member,
wherein, when the second door is in the open state, the second cam member contacts the moving member at the contacted surface,
wherein, when the second door is at a first angle located between the closed state and the open state, the second cam member contacts the moving member at the first arc portion, and
wherein, when the second door moves from the closed state to the open state, the engaging portion and the engaged portion are engaged to rotate the second cam member up to the first angle, the second cam member receives a rotational force in a direction to move the second door to be in the open state by an urging force from the moving member at a timing at which the second door moves beyond the first angle, and the second cam member is rotated to the contacted surface by the urging force.

12. The image forming apparatus according to claim 11, wherein the contacted surface includes a second arc portion with the same center as the rotational shaft center of the second cam member.

13. The image forming apparatus according to claim 10,
wherein the second door includes a first engaging portion configured to engage with the second cam member until when the second door reaches a first angle located between the closed state and the open state, from a phase of the closed state, and a second engaging portion configured to engage with the second cam member until when the second door reaches the open state from the first angle,
wherein the second cam member includes a first engaged portion configured to be engaged with the first engaging portion, and a second engaged portion configured to be engaged with the second engaging portion,
wherein the second cam member includes a third arc portion with the same center as the rotational shaft center of the second cam member, and a fourth arc portion with the same center as the rotational shaft center of the second cam member, and with a radius larger than a radius of the third arc portion,
wherein in the closed state of the second door, the second cam member contacts the moving member at the third arc portion,
wherein in a state where the second door is opened at a predetermined angle relative to the closed state, the second cam member contacts the moving member at the fourth arc portion, and
wherein, until when an engagement portion between the second door and the second cam member is changed from the first engaging portion to the second engaging portion, the second cam member does not receive the rotational force in the direction in which the second door is turned into the open state by the urging force applied by the moving member.

14. The image forming apparatus according to claim 13, wherein the second cam member includes a fifth arc portion with a center different in position from the rotational shaft center of the second cam member, and configured to connect the third arc portion and the fourth arc portion.

15. The image forming apparatus according to claim 6, wherein, when the second door is in the open state, the engaging portion of the second door does not receive an urging force from the moving member.

16. The image forming apparatus according to claim 1,
wherein the first door is a door to be used for attaching and detaching a process unit required for forming the toner image on the sheet using an electrophotographic process, and
wherein the second door is a door to be used for performing a jam clearance operation in a case where a paper jam of the sheet occurs in the fixing unit.

* * * * *